(12) United States Patent (10) Patent No.: US 12,087,041 B2
Freytag et al. (45) Date of Patent: Sep. 10, 2024

(54) MICROSCOPY SYSTEM AND METHOD FOR GENERATING A VIRTUALLY STAINED IMAGE

(71) Applicant: Carl Zeiss Microscopy GmbH, Jena (DE)

(72) Inventors: Alexander Freytag, Erfurt (DE); Matthias Eibl, Jena (DE); Christian Kungel, Penzberg (DE); Anselm Brachmann, Jena (DE); Daniel Haase, Zoellnitz (DE); Manuel Amthor, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 18/565,315

(22) PCT Filed: May 30, 2022

(86) PCT No.: PCT/EP2022/064646
§ 371 (c)(1),
(2) Date: Nov. 29, 2023

(87) PCT Pub. No.: WO2022/253773
PCT Pub. Date: Dec. 8, 2022

(65) Prior Publication Data
US 2024/0265682 A1 Aug. 8, 2024

(30) Foreign Application Priority Data
Jun. 2, 2021 (DE) ...................... 10 2021 114 290.3

(51) Int. Cl.
*G06V 10/26* (2022.01)
*G06T 5/20* (2006.01)
(Continued)

(52) U.S. Cl.
CPC .............. *G06V 10/774* (2022.01); *G06T 5/20* (2013.01); *G06T 5/70* (2024.01); *G06T 7/0002* (2013.01);
(Continued)

(58) Field of Classification Search
CPC .. G06V 10/273; G06V 10/759; G06V 10/774; G06V 10/776; G06V 10/82;
(Continued)

(56) References Cited

U.S. PATENT DOCUMENTS 9,786,050 B2 10/2017 Bhargava
10,013,760 B2 7/2018 Bhargava
(Continued)

FOREIGN PATENT DOCUMENTS

EP 3553165 A1 10/2019
WO 2019241155 A1 12/2019

OTHER PUBLICATIONS

Alvarenga, Lauren, "A Video Introduction to Label-Free Nucleus Detection with TruAI Technology", Olympus Discovery Blog, , https://www.olympus-lifescience.com/en/discovery/a-video-introduction-to-label-free-nucleus-detection-with-truai-technology/, Sep. 2, 2020, 2 pgs.
(Continued)

*Primary Examiner* — Jacinta M Crawford
(74) *Attorney, Agent, or Firm* — LaBatt, LLC

(57) ABSTRACT

A method generates an image processing model to calculate a virtually stained image from a microscope image. The image processing model is trained using training data comprising microscope images as input data into the image processing model and target images that are formed via chemically stained images registered locally in relation to the microscope images. The image processing model is trained to calculate virtually stained images from the input
(Continued)

FIG. 6 microscope images by optimizing an objective function that captures a difference between the virtually stained images and the target images. After a number of training steps, at least one weighting mask is defined using one of the chemically stained images and an associated virtually stained image calculated after the number of training steps. In the weighting mask, one or more image regions are weighted based on differences between locally corresponding image regions in the virtually stained image and in the chemically stained image. Subsequent training considers the weighting mask in the objective function.

18 Claims, 11 Drawing Sheets

(51) Int. Cl.
| | |
|---|---|
| *G06T 5/70* | (2024.01) |
| *G06T 7/00* | (2017.01) |
| *G06T 11/00* | (2006.01) |
| *G06V 10/75* | (2022.01) |
| *G06V 10/774* | (2022.01) |
| *G06V 10/776* | (2022.01) |
| *G06V 10/82* | (2022.01) |

(52) U.S. Cl.
CPC .......... *G06T 11/001* (2013.01); *G06V 10/273* (2022.01); *G06V 10/759* (2022.01); *G06V 10/776* (2022.01); *G06V 10/82* (2022.01); *G06T 2207/10056* (2013.01); *G06T 2207/20081* (2013.01); *G06T 2207/20084* (2013.01); *G06T 2207/30024* (2013.01); *G06T 2207/30168* (2013.01)

(58) Field of Classification Search
CPC .. G06T 5/20; G06T 5/70; G06T 7/002; G06T 11/001; G06T 2207/10056; G06T 2207/20081; G06T 2207/20084; G06T 2207/30024; G06T 2207/30168
USPC .......................................................... 345/589
See application file for complete search history.

(56) References Cited

U.S. PATENT DOCUMENTS

| | | | |
|---|---|---|---|
| 2019/0188446 A1* | 6/2019 | Wu ...................... | G06V 20/695 |
| 2020/0394825 A1 | 12/2020 | Stumpe et al. | |
| 2021/0304401 A1* | 9/2021 | Lau ...................... | G06T 7/0012 |

OTHER PUBLICATIONS

Christiansen et al., "In Silico Labeling: Predicting Fluorescent Labels in Unlabeled Images", Cell 173, Apr. 19, 2018, pp. 792-803.
Zikry et al., "In and Out of the nucleus: CNN based segmentation of cell nuclei from images of a translocating sensor", PEARC '19, Jul. 28-Aug. 1, 2019, 4 pgs.
Fujita et al., "Cell Detection and Segmentation in Microscopy Images with improved Mask R-CNN", ACCV 2020 Workshops, LNCS 12628, pp. 58-70, 2021.
De Haan et al., "Deep-Learning-Based Image Reconstruction and Enhancement in Optical Microscopy", Proceedings of the IEEE, vol. 108, No. 1, Jan. 2020, pp. 30-50.
Mahmood et al., "Deep Adversarial Training for Multi-Organ Nuclei Segmentation in Histopathology Images", IEEE Transactions on Medical Imaging, vol. 39, No. 11, Nov. 2020, pp. 3257-3267.
Vuola et al., "Mask-RCNN and U-NET Ensembled for Nuclei Segmentation", 2019 IEEE 16th International Symposium on Biomedical Imaging (ISBI 2019), Venice, Italy, Apr. 8-11, 2019, pp. 208-212.
Wieslander et al., "Learning to see colours: generating biologically relevant fluorescent labels from bright-field images", https://www.biorxiv.org/content/10.1101/2021.01.18.427121v3, Jan. 27, 2021, 13 pgs.
Application No. 10 2021 114 290.3, German Search Report (English translation not available), Mar. 22, 2022, 9 pgs.
International Search Report and Written Opinion with English translation for International Application No. PCT/EP2022/064646, dated Oct. 11, 2022, 25 pgs.
Ounkomol et al., "Label-free prediction of three-dimensional fluorescence images from transmitted light microscopy", May 23, 2018, 25 pgs.
Isola et al., "Image-to-Image Translation with Conditional Adversarial Networks", https://arxiv.org/pdf/1611.07004.pdf, Nov. 26, 2018, 17 pgs.
Li et al, "Deep Learning for Virtual Histological Staining of Bright-Field Microscopic Images of Unlabeled Carotid Artery Tissue", Molecular Imaging & Biology, vol. 22, No. 5, Jun. 8, 2020, pp. 1301-1309.
Wang et al., "Deep learning enables cross-modality super-resolution in fluorescence microscopy", Nature Methods, vol. 16, No. 1, Dec. 17, 2018, pp. 103-110.
Jaeger et al., "Retina U-Net: Embarrassingly Simple Exploitation of Segmentation Supervision for Medical Object Detection", Proceedings of Machine Learning Research 116, 2020 Machine Learning for Health (ML4H) at NeurIPS 2019, pp. 171-183.
Application No. 10 2021 114 291.1, German Search Report (English translation not available), Mar. 22, 2022, 11 pgs.
International Application No. PCT/EP2022/064649, International Search Report with English translation, dated Oct. 17, 2022, 7 pgs.

* cited by examiner

MICROSCOPY SYSTEM AND METHOD FOR GENERATING A VIRTUALLY STAINED IMAGE

TECHNICAL FIELD

The present disclosure relates to a microscopy system, a computer-implemented method for generating a virtually stained image, and computer-implemented methods for generating an image processing model that calculates a virtually stained image from a microscope image.

BACKGROUND

In particular in the analysis of biological samples, staining methods are widely used to make certain structures of the sample visible. In histochemical methods, samples are prepared by adding dyes that concentrate, for example, in certain cell organelles or tissue structures. A basic dye can be adsorbed on, e.g., acidic cell structures such as DNA in the cell nucleus, so that the stained structures stand out more from a background or other structures in a captured image. In fluorescence staining, fluorophores emit measurable detection light after irradiation with suitable excitation light. Fluorophores can be naturally contained in samples or be added during a sample preparation. For example, in a transfection staining, DNA or RNA is introduced into a cell, and fluorophores are formed through the expression of the same. The fluorophores stain certain cell organelles and improve their visibility. In particular an image that utilizes such a chemical staining is also called a chemically stained image in the present disclosure. In transfection staining, certain cell organelles are stained by the formed fluorophores and thus rendered more visible.

Although chemical staining methods advantageously improve the visibility of certain structures, they are also associated with drawbacks. The sample preparation and in particular the dye itself can subject a sample to considerable stress. The illumination in the light microscope can subject the sample to additional stress and result, e.g., in a photobleaching or phototoxicity. Moreover, chemical stainings are not always reliable. In a staining by transfection, in which specific DNA or RNA sequences are introduced into cells for staining, the transfection rate typically does not reach 100%. As a result, some cells do not express fluorophores and are erroneously not visible in fluorescence images. At least some of the chemically stained images thus generally also contain image regions that are erroneously not stained. Moreover, there can also occur a bleed-through of fluorophores from a structure to be stained. Other sample regions than the structure to be stained are thereby stained.

Virtual staining techniques have been developed in particular in order to avoid subjecting a cell to stress as the result of staining methods. In this context, a microscope image is captured without the use of staining methods, for example a phase contrast image, from which an image processing model calculates a virtually stained image. Such methods are described, e.g., in EP 3 553 165 A1, U.S. Pat. No. 9,786,050 B2, U.S. Pat. No. 10,013,760 B2 as well as in:

Christiansen, Eric et al., "In Silico Labeling: Predicting Fluorescent Labels in Unlabeled Images," 2018, Cell 173, 792-803, Apr. 19, 2018, Elsevier, doi: https://doi.org/10.1016/j.cell.2018.03.040

Ounkomol, Chawin et al., "Label-free prediction of three-dimensional fluorescence images from transmitted light microscopy", bioRxiv preprint, 23 May 2018, https://doi.org/10.1101/289504

Alvarenga, Lauren, Olympus Discovery Blog, 2 Sep. 2020, "A Video Introduction to Label-Free Nucleus Detection with TruAI Technology", https://www.olympus-lifescience.com/en/discovery/a-video-introduction-to-label-free-nucleus-detection-with-truai-technology/

As background information, reference is also made to a method for calculating an output image from an input image using conditional generative adversarial networks:

Isola, Phillip et al., "Image-to-Image Translation with Conditional Adversarial Networks", arXiv: 1611.07004v3 [cs. CV] 26 Nov. 2018

To form an image processing model, training data is typically adopted that comprises microscope images (e.g. phase contrast images without staining) and corresponding locally registered chemically stained images (e.g. fluorescence images). The microscope images can be used as input data and the chemically stained images can be used as target images (ground truth) in the training of the image processing model. After the training, the image processing model is able to calculate a virtually stained image that is intended to correspond to a chemically stained image from a microscope image.

As staining methods are not always reliable, as described in the foregoing, the chemically stained images of the training data also contain corresponding errors, in particular structural regions that are erroneously stained or erroneously only faintly stained or not stained at all. If an image processing model is learned using such training data, a moderate quality of the virtually stained images generated by the model is likely. A manual correction of the chemically stained images of the training data is scarcely possible for a user.

There thus exists an ongoing need to be able to provide high-quality stained images of microscopic samples while avoiding the subjection of samples to the stress associated with staining methods.

SUMMARY

It can be considered an object of the invention to indicate a microscopy system and methods which make it possible to generate stained images of microscopic samples in a particularly high quality and with a minimal subjection of the sample to stress.

This object is achieved by means of the microscopy system with the features of claim 15 and the methods with the features of claims 1 and 14.

An embodiment of the invention relates to a computer-implemented method for generating an image processing model in order to calculate a virtually stained image from a microscope image. The method comprises a training of the image processing model using training data. The training data comprises at least microscope images as input data into the image processing model and target images that are formed via chemically stained images registered locally in relation to the microscope images. The image processing model is trained to calculate virtually stained images from the input microscope images by optimizing an objective function that captures a difference between the virtually stained images and the target images. At least one weighting mask is defined after a number of training steps using one of the chemically stained images and an associated virtually stained image calculated with the image processing model after the number of training steps. In the weighting mask, one or more image regions are weighted as a function of or based on differences between locally corresponding image regions in the virtually stained image and in the chemically stained image. The training is continued, wherein the weighting mask is taken into account in the objective function.

Different variants of the invention exploit the fact that, in the course of the training, the image processing model learns relatively quickly to roughly recognize a structure to be stained in a microscope image and to stain the corresponding image region. Detail structures are usually not reproduced correctly at this early stage of the training, but a position of a structure to be stained can be captured relatively reliably and precisely. In customary training data, some of the chemically stained images and consequently some of the target images erroneously do not exhibit any stained structures. If the training of the image processing model were to be continued in a manner that is not in accordance with the invention, the image processing model would learn to replicate the erroneously missing stainings in the further course of the training, i.e. to generate virtually stained images with inaccurate regions. This is avoided by using at least one weighting mask. The weighting mask assigns a weight or different weights to one or more image regions. With these weights, the corresponding image regions of the virtually stained image and the chemically stained image are taken into account in the following iterative adjustment of the model parameter values of the image processing model. It is thus possible by means of the weighting mask to reduce a contribution of an image or of a certain image region to the training. In particular, the weighting mask can reduce precisely the contributions of those image regions in which a staining is erroneously missing in the chemically stained image. These image regions can be identified at an early stage of the training with the help of the virtually stained images. For, as described, the image processing model is able at an early stage of the training to generate virtually stained images in which structures to be stained in the microscope images are captured and stained relatively reliably, except that generated details within the structures appear unnatural. By offsetting such a virtually stained image, in which all or most of the sample regions to be stained are captured locally, against a chemically stained image in which a structure is erroneously not stained, it is possible to identify the presence and location of this structure. The weighting mask assigns a lower weight to the image region of this structure than to other image regions or, alternatively, the weighting mask assigns a lower weight to this image than to other images. This ensures that errors in chemically stained images have no or a reduced influence on the training result. As a result, an image processing model is learned that is able to calculate high-quality virtually stained images even when the underlying training data contains errors. A weighting mask can be used automatically or first displayed to a user for verification. The user can then decide whether the weighting mask should be used or rejected. An option of manually correcting the calculated weighting mask can also be presented to the user, whereupon the corrected weighting mask is used in the further training. After the training, the image processing model may even be able to generate virtually stained images that have a higher quality, i.e. fewer inaccurate stainings, than chemically stained images captured in a typical manner. It thereby becomes possible to generate images of a sample in a particularly high quality while the subjection of the sample to the stress associated with chemical stainings and the expenditure involved in chemical stainings in terms of preparation and equipment can be eliminated.

In a further embodiment of the invention, a computer-implemented method for generating an image processing model is provided in order to calculate a virtually stained image from a microscope image. The method comprises a training of the image processing model using training data. The training data comprises at least microscope images as input data into the image processing model and target images that are formed via chemically stained images registered locally in relation to the microscope images. An evaluation of one of the chemically stained images or of an image region of the same is calculated after a number of training steps. The evaluation evaluates differences between locally corresponding image regions in the chemically stained image and in an associated virtually stained image calculated with the image processing model after the number of training steps. Depending on the evaluation, the training data is changed by removing the chemically stained image or an image region of the same from the training data. The training is continued or reinitiated with the changed training data.

By removing chemically stained images with a relatively large number of inaccurate stainings from the training data, a higher-quality model can be obtained in order to generate virtually stained images. As this approach is primarily based on an automated analysis of virtually stained images calculated in the course of the training by the model itself, a manual effort is minimal.

A further embodiment of the invention relates to the use of the computer-implemented method for generating an image processing model after completion of the training, that is to say, in an inference mode in which it is meant to process at least one microscope image not seen in the training. This embodiment thus relates to a computer-implemented method for generating a virtually stained image, wherein a microscope image is obtained; using the microscope image, a virtually stained image is calculated by means of an image processing model formed according to the method according to the invention for generating an image processing model.

The invention also relates to a microscopy system with a microscope for image capture and a computing device that is configured to execute the computer-implemented method according to the invention.

A further aspect of the invention finally relates to a computer program comprising commands that, when the program is executed by a computer, cause said computer to execute a computer-implemented method according to the invention.

Optional Embodiments

Variants of the microscopy system according to the invention and of the method according to the invention are the object of the dependent claims and are explained in the following description.

Objective Function

A model is learned in machine-learning methods by iteratively optimizing an objective function. The objective function can also be called a reward/loss function and can comprise a reward function to be maximized and/or a loss function to be minimized. The objective function captures a difference between the virtually stained images output by the image processing model and the associated target images. In a loss function, this difference is to be minimized, while in a reward function a correspondence between the virtually stained images and the associated target images is to be maximized. For example, a difference (e.g., the absolute value of the difference or the square of the difference) can respectively be calculated for a pixel of a virtually stained image and a locally corresponding pixel of the associated target image, and the differences can then be added for all pixels. More complex approaches are possible in order to reduce, e.g., the significance of small shifts of a few pixels or small rotations.

Taking the Weighting Mask into Account in the Objective Function

Taking the weighting mask into account in the objective function can be understood in the sense that the mathematical operation in which a chemically stained image and an associated virtually stained image are employed in the objective function is changed according to the weighting mask.

In particular, differences between one of the target images and the associated virtually stained image can be weighted as a function of location according to the associated weighting mask. Accordingly, not every location within a target image and the associated virtually stained image contributes equally to a result of the objective function. Rather, the locations are weighted by the corresponding entries in the weighting mask. For example, a pixelwise difference between a target image and the associated virtually stained image can be ascertained. These pixelwise differences are now not simply added together in the objective function, but rather first multiplied by the corresponding entry in the weighting mask. The weighting mask can be, e.g., an image with the same number of rows and columns as a target image or virtually stained image, so that each pixel in the weighting mask corresponds to the locally corresponding pixel of the target image/virtually stained image according to its position in the image. Alternatively, the weighting mask can also be a 2D matrix or some other array in which entries are assigned to specific regions or pixels of the target image/virtually stained image.

A mathematically equivalent or similar alternative to the use of the weighting mask described in the foregoing provides that a virtually stained image as calculated with current values of model parameters of the image processing model is first modified before entering the objective function. According to the first variant described, a difference between a pixel of the target image and a corresponding pixel of the associated virtually stained image is calculated (for example, the two pixels can have values of 20 and 30, so that the difference has a value of 10), and this difference is then multiplied by a weighting value (e.g. a weighting value of 0.5, which results in a contribution in the objective function of 0.5*10=5). A mathematically similar result is achieved when, instead of a pixel of the virtually stained image, a superimposition of this pixel and the locally corresponding pixel of the target image is employed, wherein the weighting value indicates the ratio in which the two pixels are superimposed. Taking the above numerical values, the pixel with the value 20 of the virtually stained image is thus superimposed with the pixel with the value 30 of the target image, wherein the superimposition is carried out with a weighting value of 0.5, so that the new pixel value is 25. The difference in relation to the pixel value of 30 of the target image is now formed, which again yields 5. In this example, an entire virtually generated image is employed in a calculation as follows before entering the objective function:

(1−weighting mask)*virtually generated image+ weighting mask*target image

Analogous calculations for superimposing the images using the weighting mask are possible when differences are captured as a sum of squares or in some other manner.

The weighting mask can thus be taken into account in the objective function by modifying the virtually stained image (associated with the weighting mask) entering the objective function by superimposing the virtually stained image and the associated chemically stained image. The weighting mask defines the weights with which the virtually stained image and the associated chemically stained image are superimposed. If an image region in the target image is inaccurately not stained (e.g., a cell organelle that is not stained due to failed transfection), the aforementioned calculation unstains the corresponding image region of the virtually stained image as output by the image processing model and only then compares it with the target image.

The variant described in the foregoing can also be varied by modifying the target image instead of the virtually stained image before the image data enters the objective function. The above descriptions apply to this embodiment with the proviso that the statements pertaining to the virtually stained image and the target image are interchanged.

Forming a Weighting Mask

A weighting mask specifies a respective weighting for one or more image regions. In principle, a single image region can encompass the entire image, so that a single weighting value defines the contribution of a virtually stained image and the associated target image entering the objective function. In different variant embodiments, however, the weighting mask specifies different weightings for a plurality of image regions as a function of differences between locally corresponding image regions in the virtually stained image and in the chemically stained image. The differently weighted image regions thus contribute in different degrees when the training is continued.

A weighting mask can be formed by comparing a chemically stained image and an associated virtually stained image. For each calculated virtually stained image, a respective weighting mask pertaining to the associated virtually stained image can be calculated. For the sake of clarity, a weighting mask is described in the singular form in different variant embodiments although further weighting masks can be calculated in a corresponding manner from other pairs consisting of a virtually stained image and a chemically stained image.

In the weighting mask, an image region can be given a weaker weighting as a function of whether the locally corresponding image region in the virtually stained image exhibits a stronger staining than the locally corresponding image region in the chemically stained image. A stronger staining can be understood as a higher brightness of a colour channel or of a certain colour or also as a stronger saturation or intensity. In the case of a transfection staining of cell organelles, there are presumably cell organelles located in said image regions for which a transfection failed. By means of the weaker weighting, these image regions contribute less to the objective function.

In one embodiment, the weighting mask can be formed by first performing the calculation max(virtually stained image−target image,0), that is to say, the positive part of the difference between the virtually stained image and the target image is calculated. The positive part is zero for pixels for which the pixel of the target image is greater than the locally corresponding pixel of the virtually stained image; otherwise, the positive part is equal to the (absolute) difference between a pixel of the virtually stained image and the locally corresponding pixel of the target image.

The thus calculated image can be smoothed, as described in greater detail later on.

The image can then be compressed into a value range of, e.g., 0 to 1, and the range of 0 to 1 is inverted into a range of 1 to 0, e.g., by multiplying by −1 and then adding 1. The resulting image constitutes a weighting mask. By inverting the value range, a weighting (a weight value) becomes smaller, i.e. tends towards zero, if an associated pixel of the virtually stained image is significantly larger than the locally corresponding pixel of the target image.

A mask can in particular be understood as one or more 2D matrices of entries applied to image data or superimposed over the image data. In particular, the mask can be constituted by an image that is multiplied or otherwise operated on pixelwise by a virtually stained image, a target image or an offset of the virtually stained image against the target image.

In some variants of the invention, determined weightings are used as relative weights instead of as absolute weights. In this case, a weighting mask affects the ratio of the contribution of image regions within the same image relative to one another without changing the overall weighting of the associated image pair consisting of a target image and a virtually stained image.

Alternatively, a weighting mask can define a weighting of zero for an entire image. The associated virtually stained image and the associated target image thus do not contribute to the next adjustment of the model parameter values. For subsequent training epochs, the images weighted once with zero can remain permanently excluded. Alternatively, a new virtually stained image can be calculated with the respectively current model parameter values via which a new weighting mask can be calculated, so that there is not necessarily a permanent exclusion.

In different embodiments, a weight reduction is described for specific image regions or images. Alternatively, the weighting of remaining images or image regions can also be increased, which likewise results in a relative weight reduction of the specific image regions or images.

Optionally, there are no weighting masks at the beginning of the training or merely weighting masks with identical weightings, e.g. a universal weighting of 1. The definition of at least one weighting mask in the described manner occurs for the first time after a number of training steps, generally after one or more training steps. A training step can denote an iterative adjustment of the model parameters. In each training step, a plurality of the microscope images can be input into the image processing model and the thus calculated virtually stained images are input into the objective function. An adjustment of the model parameters is calculated with the objective function by means of a gradient descent method. The adjustment of the model parameters is followed by a next training step in which more of the microscope images are input into the image processing model. A training epoch can be understood as a training phase consisting of a plurality of training steps that lasts until each of the microscope images of the training data has been input into the image processing model once or at least once. An iterative adjustment of model parameter values can occur once or multiple times per training epoch. A multiple adjustment can occur when the training data is divided into groups (batches) so that a model parameter adjustment occurs after each batch. The number of training steps after which a weighting mask is employed for the first time can be predetermined or defined automatically in the course of the training as a function of a training progress. To this end, e.g., generated virtually stained images can be evaluated by image analysis according to predetermined criteria, in particular according to whether stained structures are present that meet specifications regarding a certain shape and size.

Compared to a removal of image data from the training data, a weight reduction offers different advantages. Among other things, the microscope images can still be used for an autoencoder in a multi-head training. An autoencoder comprises an encoder and a decoder, wherein the output of the encoder is input into the decoder. The output of the encoder is a data-compressed representation of an input microscope image. The encoder is thus suitable for feature extraction from a microscope image. The encoder can be used as a first part of the image processing model. A second part of the image processing model in the form of a decoder can receive the output of the encoder and is different from the decoder of the autoencoder. A training of the image processing model can occur together with the training of the autoencoder. In these variants, the image processing model benefits from the feature extraction of the encoder. In addition, it is advantageous for the training of the encoder via the objective function of the autoencoder if the training data still contains the entire microscope images and images or image regions have not been removed because the associated chemically stained images contain defects. In these embodiments, the described weighting reduction can relate solely to the decoder of the image processing model while the encoder is not affected by the same.

Selection Mask for Creating the Weighting Mask

A weighting mask can be created by means of a selection mask. The selection mask is a mask or an image that specifies image regions for which a variable weighting is to be determined. For other image regions, on the other hand, ideally a constant weighting factor of, e.g., 1 is defined. The selection mask thus selects image regions that are to be weighted.

In particular, the selection mask can be calculated by image analysis of a virtually stained image and display which image regions in the virtually stained image are stained and which image regions are not stained. In a simple case, the selection mask can be a binary mask in which a pixel has a value of 1 when a locally corresponding pixel in the virtually stained image has a pixel value above a predetermined threshold value (i.e., when said pixel is stained), and otherwise has a value of 0 (i.e., when the corresponding pixel in the virtually stained image is not stained, i.e., has a pixel value below the threshold value). The threshold value can also be set to zero, so that all pixel values above zero denote a staining. In a further alternative, the threshold value is variably defined as a function of an image noise level, so that a mere image noise is not identified as a staining. By means of the weighting mask, only image regions that have a value of 1 in the selection mask, i.e. that are indicated as stained, are weighted variably. Remaining image regions receive a constant weighting factor, regardless of differences between the corresponding image regions of the virtually stained image and the chemically stained image.

In this embodiment, the selection mask ensures that the variable weighting is restricted to image regions in which structures to be stained are assumed to be present and thus in which it can erroneously occur that the structure in the chemically stained image is erroneously not stained. In other image regions, there is no intervention in the learning process by means of variable weightings.

A calculation of the selection mask can occur, for example, by means of a segmentation program or model, which receives a virtually stained image as input and generates a segmentation mask therefrom. The segmentation mask classifies pixels or image regions into the categories "stained" and "not stained" and can be used as a selection mask.

Instead of a pixelwise classification, the selection mask can also respectively indicate a common classification for image regions, i.e. for a plurality of adjacent pixels. To this end, there can occur, e.g., a smoothing or averaging of the values of adjacent pixels, which is followed by a threshold value comparison. The size (number of pixels) of an image window that is to be taken into account for a smoothing or averaging can be specified or defined as a function of an average size of structures to be stained. The image window can be set, e.g., to a size equal to the average size of structures to be stained or in the range+/−50% of the average size. Artefacts or other structures that cannot be structures to be stained due to their size are thereby excluded from the selection mask.

A respective selection mask can be defined for each weighting mask.

A weighting mask can be calculated in particular via a selection mask and an impact mask. The impact mask can be calculated as a difference (or positive part of the difference) between a virtually stained image and the associated target image. The difference is determined pixelwise, i.e., a difference is respectively determined between locally corresponding pixels of the two images. A value range of the impact mask can be compressed, e.g., to 0 to 1. Image points or pixels of the selection mask can have a value of 1 for regions to be stained and a value of 0 for other regions. The product of the selection mask and the impact mask can now be subtracted from a starting mask that has the value 1 in each pixel in order to obtain the weighting mask. The calculation can be supplemented by a blurring or intensification of an image blurriness, as described in greater detail later on. In a further variant, the selection mask does not have a value of 0 for other regions (background regions), but rather a value that is greater than 0 and less than 1. Background regions are thereby given a weaker weighting, which increases the relevance of a correct prediction in the image regions to be stained. This can influence the learning process positively in particular when the image regions to be stained make up a relatively small percentage of the overall image.

Updating the Weighting Mask

After an initial calculation of a weighting mask, the weighting mask can be updated or replaced by calculating a new weighting mask in the further course of the training. The weighting mask can in particular be updated in each training epoch or at least in some training epochs. A training epoch can comprise one or more iteration passes. An iteration pass denotes the processes according to which a microscope image or a group (batch) of microscope images is input into the image processing model, which calculates virtually stained images therefrom, which together with the associated target images and the weighting masks enter the objective function, from which changes in the model parameter values are determined by backpropagation (e.g. by stochastic gradient descent). If the training data is divided into multiple batches, a training epoch comprises multiple iteration passes after which all microscope images or batches of microscope images have been entered into the image processing model. A weighting mask can relate to a target image (or its contribution to the objective function), so that an updating of the weighting mask occurs, e.g., once per epoch and thus each time the associated target image is used.

A current weighting mask can thus be calculated with the respectively current state of the training via the correspondingly calculated virtually stained image and the associated target image.

If a selection mask is used, it is also possible for the weighting mask to be kept constant over multiple training steps or training epochs or to remain constant after an initial calculation, while the weights are continuously updated, e.g., in each epoch or regularly after a certain number of epochs, for the image regions selected by means of the selection mask.

An updating of the weighting mask can occur by recalculating the weighting mask in the described manner. Alternatively, a previous weighting mask calculated for the same target image in a previous training epoch can also be taken into account. For example, an average of a recalculated weighting mask and the previous weighting mask can be used as the updated weighting mask.

GAN for Preventing Excessively Strong Predicted Stainings

Depending on design, there is the possibility that an optimization of the objective function, in particular a minimization of a loss function, would be achieved in an undesirable manner: this is the case when the image processing model learns to predict strong stainings everywhere in order to augment differences with the target images and consequently reduce the weighting of all image regions, so that the loss of the loss function is reduced. To rule this out, different approaches are possible.

For example, the image processing model can be or comprise a generator of a generative adversarial network. A generative adversarial net (GAN) comprises at least one generator and one discriminator. In the present case, the generator does not receive a random vector as input, but rather a microscope image or a feature vector formed from the microscope image. The GAN is thus also called a conditional GAN. An output of the generator is the virtually stained image. The discriminator of the GAN receives at least one image pair as input. The image pair can comprise a microscope image and a virtually stained image generated therefrom by the generator. Other image pairs comprise a microscope image and an associated chemically stained image. An output of the discriminator is a discrimination result that indicates what kind of image pair (an image pair with a virtually stained image or with a chemically stained image) was entered. The generator and the discriminator are trained together. The present design can differ from known structures of a conditional GAN, inter alia, in that the weighting mask is taken into account in particular solely for the generator, i.e. for the objective function of the image processing model or for an expression (correctness score) of a common generator-discriminator objective function, which describes a classification of an image pair with a virtually stained image by the discriminator as an image pair with a chemically stained image/target image. The weighting mask is not taken into account, however, for an objective function of the discriminator, i.e. for a discrimination term (adversarial loss) of the generator-discriminator objective function, which term is only used for the training of the discriminator. Optionally, another mask can be used solely for the discriminator and not for the generator. In the mask for the discriminator, weightings can be specified for the target images (the chemically stained images), for example, in order to give them a weaker weighting if missing transfections occur more frequently or few stained structures are present, which will be discussed in greater detail later on.

The additional adversarial loss expression ensures that generated virtually stained images are similar to the target images. In particular, it is excluded that the weighting mask minimizes a weighting of all image regions, in which case unrealistic images would be generated that the discriminator could distinguish from genuine images (the target images).

The approaches described above yield high-quality results if there are not too many structures in the chemically stained images that are erroneously not stained. If, on the other hand, there are many structures that are erroneously not stained, there would be a systematic difference vis-à-vis high-quality virtually stained images and the discriminator could thus detect a difference from virtually stained images, with a negative effect on the course of the training. It can therefore be provided that image pairs comprising a microscope image and an associated chemically stained image (or image sections of the same) can be input into the discriminator in the training more frequently with increasing colour strength in the chemically stained image. The discriminator thus does not see all chemically stained images equally frequently. Rather, the chemically stained images in which there are only a few structures that are erroneously not stained are input more frequently into the discriminator.

In order to avoid that chemically stained images with a large number of missing transfections, i.e. erroneously missing stainings, are input into the discriminator frequently, the following process steps can be provided: First, a degree to which structures to be stained are inaccurately not stained is ascertained for the chemically stained images. The degree can be indicated, e.g., as a number of pixels. Image pairs comprising a microscope image and an associated chemically stained image are input into the discriminator in the training more frequently, the lower the associated degree. For example, a ranking can be established in which the chemically stained images are ordered according to the respective degree to which structures to be stained are inaccurately not stained. A frequency with which the chemically stained images are input into the discriminator per training epoch is defined according to this ranking, wherein the image with the lowest degree of structures that are inaccurately not stained is input the most frequently. The ascertainment of this degree can occur by means of the selection mask described in the foregoing. The selection mask indicates the positions of stained image regions of a virtually stained image. The corresponding positions in the associated chemically stained image can now be evaluated with regard to their colour strength, for example by adding all pixel values in these image regions. Other image regions of the chemically stained image for which the selection mask does not indicate a staining, on the other hand, are not taken into account. Similarly, the greater a number of pixels of image regions to be stained/dyed in the associated selection mask is, the more frequently chemically stained images can be shown to the discriminator per training epoch. Optionally, it is also possible to show a chemically stained image to the discriminator less frequently, the more pronounced a weight reduction according to the associated weighting mask is. That is to say, if the weighting mask reduces a weighting due to suspected missing stainings, the associated chemically stained image is input into the discriminator less frequently in the training.

Instead of different frequencies with which chemically stained images are shown to the discriminator, it is also possible to use a mask with weights. The above statements can be varied by defining a greater weighting instead of a greater frequency.

In all described variants, it is in turn possible to use image sections instead of entire images. In particular, the aforementioned ranking can relate to image sections instead of entire images.

Value Range of Weights for Preventing Excessively Strong Predicted Stainings

The foregoing variant embodiments use a GAN to prevent strong stainings from being predicted in the course of the training in all image regions in order to minimize a loss function, which would reduce the weight values of the weighting mask. Additionally or alternatively, a minimum value can be specified for the weightings, so that all image regions in the weighting mask have a weighting that is greater than zero.

In the case of a minimum weighting, the weighting mask can also be used in a GAN for both the generator and the discriminator.

Smoothing/Blurring

It can be desired that the differences between a virtually stained image and an associated chemically stained image result in a reduced weighting solely for image regions that are inaccurately stained or inaccurately not stained in a chemically stained image. In other image regions, on the other hand, differences between the virtually stained image and the corresponding chemically stained image are not meant to result in a reduced weighting, as these differences can, for example, reflect the progress of the yet to be completed training or can be caused by image noise, dust or other artefacts. For the determination of the weighting mask, it can thus be provided to carry out a smoothing or blurring of image data with a filter size of a magnitude corresponding to a size of stained image regions of the chemically stained images. This filtering generates a blurriness between adjacent pixels and reduces the impact of smaller objects. A corresponding magnitude can mean that the filter size is set to a value between 0.3 and 2 times the average size of stained structures of the chemically stained images. The image data filtered in this manner can be the virtually stained images and/or the target images, wherein a difference between these filtered images is subsequently calculated. Alternatively, a difference or difference mask between the virtually stained images and the target images can be determined first and only then is the smoothing or blurring carried out, by which means in part more reliable results have been achieved experimentally.

By means of a subsequent threshold value comparison, it is possible to filter out difference values that lie below the threshold value, so that difference values are not included in the weighting mask in a weight-reducing manner.

The described smoothing or blurring is used solely for the calculation of the weighting mask, while the virtually stained images and the target images enter the objective function without smoothing or additional blurring.

Interactive Determination of a Weighting Mask

Optionally, the calculated weighting masks or some of the calculated weighting masks can also be displayed to a user on a screen, wherein the user is provided with selection options to confirm the weighting mask, to change weighting values within the weighting mask, or to reject the weighting mask. The selection mask or some of the calculated selection masks can also be displayed to the user with the option of changing region boundaries of the selection mask, e.g. by marking new boundaries. According to the selection mask modified by the user, variable weight values are automatically calculated in the correspondingly marked regions based on the pixel differences in the virtually stained image and the chemically stained image. Alternatively, it is also possible for these weight values to be modified or defined by the user.

These specifications of a user can optionally be maintained for multiple or all future training epochs, so that an updating of the associated selection mask or weighting mask does not occur. For example, a case can occur in which a stained region of a chemically stained image is classified in a selection mask as background, i.e. as not stained, and is downweighted in the weighting mask because the chemically stained region is classified as an inaccurate staining based on differences with an associated virtually stained image. If a user now changes this classification, for example by changing the selection mask or the weighting mask in the corresponding image region, this correction can be maintained in the following training.

In order to keep the effort of a manual verification low for a user, it is possible to provide that only some of the weighting masks or selection masks are shown to the user for verification. For this purpose, weighting masks or associated selection masks can be selected as a function of the weighting values. The smaller the weighting values and/or the more pixels there are with a weighting value below a predetermined threshold value, the more likely it is that the corresponding weighting mask or associated selection mask is displayed to the user. In particular, a ranking of the weighting masks can be created, starting with the weighting mask that contains the smallest weighting values. The first weighting masks or associated selection masks according to this ranking are displayed to the user for verification together with the corresponding associated chemically stained images.

Alternatively or additionally to the above variants, it is possible that images or image sections for which a calculated weighting mask specifies small weighting values are first identified automatically. In particular, it is possible to identify the images or image sections for which the smallest weighting values have been calculated. The images or image sections with the smallest weighting values can now be displayed to a user. This can occur in the order starting with the image section with the smallest weighting. There are presumably errors in the chemical staining of these image sections, e.g., the missing transfections explained in the introduction. A user can verify manually whether the weighting mask is correct based on the displayed images (in particular the chemically stained images). Optionally, the user is offered the option of a manual correction. Alternatively, merely the selection options can be provided that a user deems the weighting mask suitable or unsuitable. If the user classifies a weighting mask or a section of the same as unsuitable, the weighting values are changed, in particular increased or set to a default value, e.g., a weighting of 1.

Starting Weighting Masks

The described weighting masks are calculated after a number of training steps. Before, for example at the beginning of the training, one or more starting weighting masks can optionally be calculated and used for data weighting in the objective function. A starting weighting mask can be calculated from a chemically stained image and, optionally, an associated microscope image. Virtually stained images are not yet available here. A starting weighting mask can be displayed to a user for manual verification, wherein the user can adjust weights for individual pixels or regions of a starting weighting mask. According to manual changes by the user, an automatic search for similar image data can occur, for which subsequently weightings are either automatically adjusted according to the preceding manual changes of the user or are displayed to a user for manual verification.

In the aforementioned variants, a weighting for an image region or for an entire image can also be set to a value of zero, which removes the corresponding image data from the training data.

If image data is classified as unsuitable by image analysis, e.g. because artefacts or no sample regions appear to be depicted, an automatic removal or weight reduction of this image data can be carried out or recommended to a user. If the user rejects a weight reduction for this image data, an increased weighting for this image data can optionally be set automatically in order to reduce the risk of an inaccurate processing of such image data.

A starting weighting mask can be determined automatically, among other things, via a signal variation. Image regions in which a signal varies little, i.e. has essentially constant pixel values, are unlikely to contain a sample structure of interest. A weighting can thus be reduced or set to zero for these image regions. Optionally, this weight reduction is only carried out if the signal variation lies below a predetermined limit in both an image region of a microscope image and a locally corresponding image region of the associated chemically stained image. Image regions classified by image analysis as lying outside a sample vessel or cover slip can continue to be reduced in their weighting.

It is also possible for artefact detection programs to identify image regions which contain artefacts and which should thus be reduced in their weighting or completely removed from the training data. Artefacts can be, e.g., dust, water drops, scratches, fingerprints, lint or some other pollutant. The artefacts can be detected and localized, for example, by a trained object detection model or segmentation model. An anomaly detection is also possible, e.g., by means of an autoencoder or a PixelCNN in order to identify potentially inaccurate regions that should be reduced in their weighting. It is also possible for areas that belong together to be detected automatically in the chemically stained images. A user can set specifications regarding size and shape, e.g., a minimum size, a maximum size and a maximum eccentricity, whereby areas detected as belonging together can be classified as relevant sample structures (e.g., roundish cells or cell organelles of a certain size) and distinguished from other image content or artefacts. The weighting can be reduced in image regions that do not show relevant sample structures. Similarly, a user can mark a plurality of image regions that contain undesired artefacts or that are undesirable for the training data for other reasons. A search for similar image content can then be carried out automatically in other microscope images or chemically stained images, and this image content is then removed from the training data, reduced in its weighting or displayed to a user for verification. The automatic search can be carried out by means of a CBIR method (CBIR: content-based image retrieval).

Exclusion of Images from the Training Data

It can be provided that certain microscope images and associated target images or chemically stained images are removed from the training data. The image processing model is first trained for one or more training steps using the training data. This can occur in the described manner through optimization of an objective function that captures differences between calculated virtually stained images and target images. After a number of training steps, a virtually stained image is calculated from a microscope image by means of the image processing model, as per the current training state. By means of the virtually stained image (or an image region of the same), an evaluation of the associated chemically stained image (or an image region of the same) is calculated. The evaluation depends on differences between image regions in the chemically stained image and locally corresponding image regions in the associated virtually stained image. The greater the differences are, the worse the evaluation is. Depending on the evaluation, the training data is changed through the removal of the chemically stained image as well as the associated microscope image (or an image region of the same) from the training data, or these images are recommended to a user for removal. The training is subsequently continued or reinitiated.

The described approach can be carried out for a plurality or all of the microscope images and associated chemically stained images. A ranking of the evaluations can then be established. The images with the worst evaluation are removed from the training data.

The number of image data to be removed can be defined by means of a histogram analysis of the evaluated images. Alternatively or additionally, an evaluation threshold value can be predetermined. An image removal from the training data occurs as a function of whether an evaluation is better or worse than the threshold value. The evaluation can reflect the number of pixels that are stained solely in the virtually stained image but not in the chemically stained image, or vice versa. It is also possible to take into account a colour strength, in particular an extent to which locally corresponding pixel values of the virtually stained image and the chemically stained image differ.

The evaluation can in particular be carried out in accordance with the calculation of a weighting mask, which can thus also be called an evaluation mask. The weighting values of a weighting mask can be combined here into one value, which constitutes the evaluation. A low weighting corresponds to a poor evaluation. It is possible for the evaluation to relate to an entire image or for a plurality of evaluations to be calculated for different image regions of the same image. This allows individual image regions to be removed from the training data as a function of their evaluation, while remaining image regions of the same microscope image and of the associated chemically stained image remain in the training data.

The described exclusion of image data from the training data can occur in addition or alternatively to the described inclusion of a weighting mask in the objective function.

Microscope Images and Chemically Stained Images

Chemically stained images can be understood as images of a sample captured by a microscope or images generated from captured image data, wherein at least one dye is visible in the sample which is not visible or only visible to a lesser degree in the microscope image. The dye can be artificially added or can be naturally present in the sample. Depending on its type, the dye only becomes visible through excitation, as, for example, with fluorescent dyes, or the dye is already visible by simple observation. The sample analyzed in the microscope image and in the chemically stained image can be identical for both images, although the dye is not visible or only faintly visible in the microscope image due to the capture technique. For example, a chemically stained image can be captured in the form of a fluorescence image and the microscope image can be a phase contrast image. In this case, fluorophores are not visible in the phase contrast image. In other cases, a microscope image is captured first and then a dye is added, whereupon the chemically stained image is captured. In addition to a fluorophore, a dye can in principle also be any chromophore. With bright-field stains, a chemically stained image can be captured in the form of a transmitted or reflected light image. Dark-field images are also possible, depending on the dye. More generally, a microscope image and a chemically stained image can differ solely by the imaging technique and/or by a sample preparation between the capture of the two images. The qualifier "chemical" in a chemically stained image is intended to be understood as a delimitation from a virtually stained image. In a virtually stained image, a staining is added computationally (virtually), while in a chemically stained image a staining exists due to the sample, i.e. due to its physical or chemical properties. That said, it is not absolutely necessary for a special chemical treatment to occur. A chemically stained image can also be understood as an image with a specific contrast. The specific contrast can be conditional on the aforementioned dyes and is weaker or not contained in the microscope image. For example, the specific contrast can be generated by a particular fluorophore or fluorescence channel, wherein this fluorophore or fluorescence channel is not discernible in the microscope image or only to a lesser extent.

A microscope image and an associated chemically stained image are registered in relation to each other locally, i.e. a sample point has the same image coordinates within both images.

The microscope image can in principle be any image generated with a microscope, in particular a bright-field image, a phase contrast image, a DIC image (differential interference image) or a spectroscopic image that contains spectral information for each pixel. It can also be a fluorescence image captured with one fluorescence channel less than the chemically stained image, so that the missing fluorescence channel is added in the virtually stained image. This reduces the stress to which the sample is subjected due to fluorescence excitation light. Generally, a microscope image can be in principle any raw image captured by a microscope or can be a processed image. The processed image can stem from one or more raw images or already pre-processed images of a microscope. For example, a microscope image can be a perspective-transformed image and/or be formed by joining a plurality of raw images together, wherein the raw images show sample regions that are staggered laterally relative to one another (image stitching). Conversely, a microscope image can also be a section of an image generated with the microscope. It is also possible for the microscope image to be calculated by means of an adjustment of brightness, contrast or tonal values. The microscope image can in particular be an overview image or a sample image or be derived from the same. An overview image is understood to be an image captured by an overview camera, which can be provided in addition to a sample camera of the microscope with which more magnified images (sample images) of a sample region are captured. The overview camera can be attached to a stationary equipment frame, e.g., a microscope stand, or to a movable component, e.g., a sample stage, focus drive or objective revolver. The above descriptions can also apply, mutatis mutandis, to the chemically stained image.

The training data can also comprise more than one associated chemically stained image for each microscope image. For example, different stains of the same sample can be rendered visible in a plurality of chemically stained images. An image processing model learned with such training data can generate from an input microscope image multiple virtually stained images in parallel as output, corresponding to the chemically stained images used in the training.

General Features

A microscopy system denotes an apparatus that comprises at least one computing device and a microscope. A microscope can in particular be understood as a light microscope, an X-ray microscope, an electron microscope or a macroscope.

The computing device can be physically part of the microscope or be arranged separately in the vicinity of the microscope or at a location at any distance from the microscope. The computing device can also be designed in a decentralized manner. It can generally be formed by any combination of electronics and software and comprise in particular a computer, a server, a cloud-based computing system or one or more microprocessors or graphics processors. The computing device can also be configured to control the sample camera, the overview camera, image capture, the sample stage and/or other microscope components.

The sample can be any sample and can comprise, for example, biological cells or cell parts, material samples or rock samples, electronic components and/or objects held in a liquid.

The microscope is configured for an image capture, in particular of microscope images and/or chemically stained images. In some cases, the microscope is configured to capture solely a microscope image, e.g. a phase contrast image, but not to capture a chemically stained image, e.g. a fluorescence image. Virtually stained images corresponding to chemically stained images can be generated with the microscope in this case via the execution of the trained image processing model, without it being necessary for means for the capture of chemically stained images to be present.

Obtaining an image can in particular comprise the loading of an existing image from a memory or the capture of an image with a camera.

Descriptions in the singular are intended to cover the variants "exactly 1" as well as "at least one". The description that a microscope image is input into the image processing model is intended to comprise, for example, the possibilities that exactly one or at least one microscope image is entered. A common input of a plurality of microscope images can be advantageous, e.g., for an input of an image stack (z-stack) consisting of a plurality of microscope images showing sample layers at different depths, or for an input of a plurality of microscope images showing the same sample region captured in succession.

A target image can be understood as an image used in the training of the image processing model that an output (virtually stained image) of the image processing model is intended to approximate. The approximation occurs by means of an objective function, in particular a reward or loss function, which defines how differences between the output of the image processing model and the target image are evaluated. The evaluation of the differences can occur pixelwise or by comparing more abstract image descriptions, e.g. edge contours. A target image is formed using a captured chemically stained image, that is to say, the target image can in fact be a captured chemically stained image, or the target image can be formed by further processing of a chemically stained image. For example, a chemically stained image can be cropped or modified in an image property, e.g., brightness, contrast or tonal value, in order to form the target image. Other image-to-image mappings, e.g., for noise suppression, image sharpening, blurring or background suppression, are also possible in order to form the target images from chemically stained images.

An image processing model is understood to be a machine-learned model which receives at least image data as input data and calculates at least one output image therefrom. A learned model denotes a model that has been learned by a learning algorithm using training data. A model can respectively comprise, for example, one or more convolutional neural networks (CNNs), which receives at least one image in the form of the microscope image or an image derived therefrom as input. For example, a model can be designed to be fully convolutional and be formed as an image-to-image regression. A U-network is also possible in which successive layers form a U-shape in the sense that the feature maps output by the layers first become increasingly smaller in terms of the number of their rows and columns and increasingly larger in terms of their depth before becoming larger again in terms of the number of their rows and columns and smaller in terms of their depth. It is also possible to use a variational autoencoder and/or an invertible network (INN). In a supervised learning process, a respective annotation/label is specified for each microscope image, which annotation/label comprises a chemically stained image or is derived therefrom, as described. By means of a learning algorithm, model parameters of the machine learning model are defined using the training data. A predetermined objective function can be optimized to this end, e.g. a loss function can be minimized. For example, the loss function can capture pixelwise differences between an image calculated by the model and a specified target image. The pixelwise differences can be added up by amount (as absolute values) in an L1 loss function. In an L2 loss function, the sum of squares of the pixelwise differences is formed. The model parameter values are modified to minimize the loss function, which can be calculated, e.g., by gradient descent and backpropagation. In the case of a CNN, the model parameters can in particular comprise entries of convolution matrices of the different layers of the CNN. Layers that do not follow each other directly can optionally be connected by so-called "skip connections", whereby the output of a layer is transmitted not only to the immediately following layer but additionally to another layer. Other deep neural network model architectures are also possible. An output of the model can be an image in which each pixel is indicated by a brightness value. Alternatively, a brightness distribution can be indicated per pixel in the output image. A most probable brightness value with an associated uncertainty is indicated per pixel by the brightness distribution. The image can comprise one or more colour channels, which are respectively defined in this manner by a brightness value or brightness distribution.

The characteristics of the invention that have been described as additional apparatus features also yield, when implemented as intended, variants of the method according to the invention. Conversely, a microscopy system can also be configured to carry out the described method variants. In particular, the computing device can be configured to execute the described method variants. The computing device can also comprise the described computer program. While a ready-trained model is used in some variants, further variants of the invention result from the implementation of the corresponding training steps, and vice versa.

BRIEF DESCRIPTION OF THE FIGURES

Further effects and features of the invention are described in the following with reference to the attached schematic figures.

DETAILED DESCRIPTION OF EXAMPLE EMBODIMENTS

Different example embodiments are described in the following with reference to the figures. As a rule, similar elements and elements that function in a similar manner are designated by the same reference signs.

FIG. 1

Figure 1:
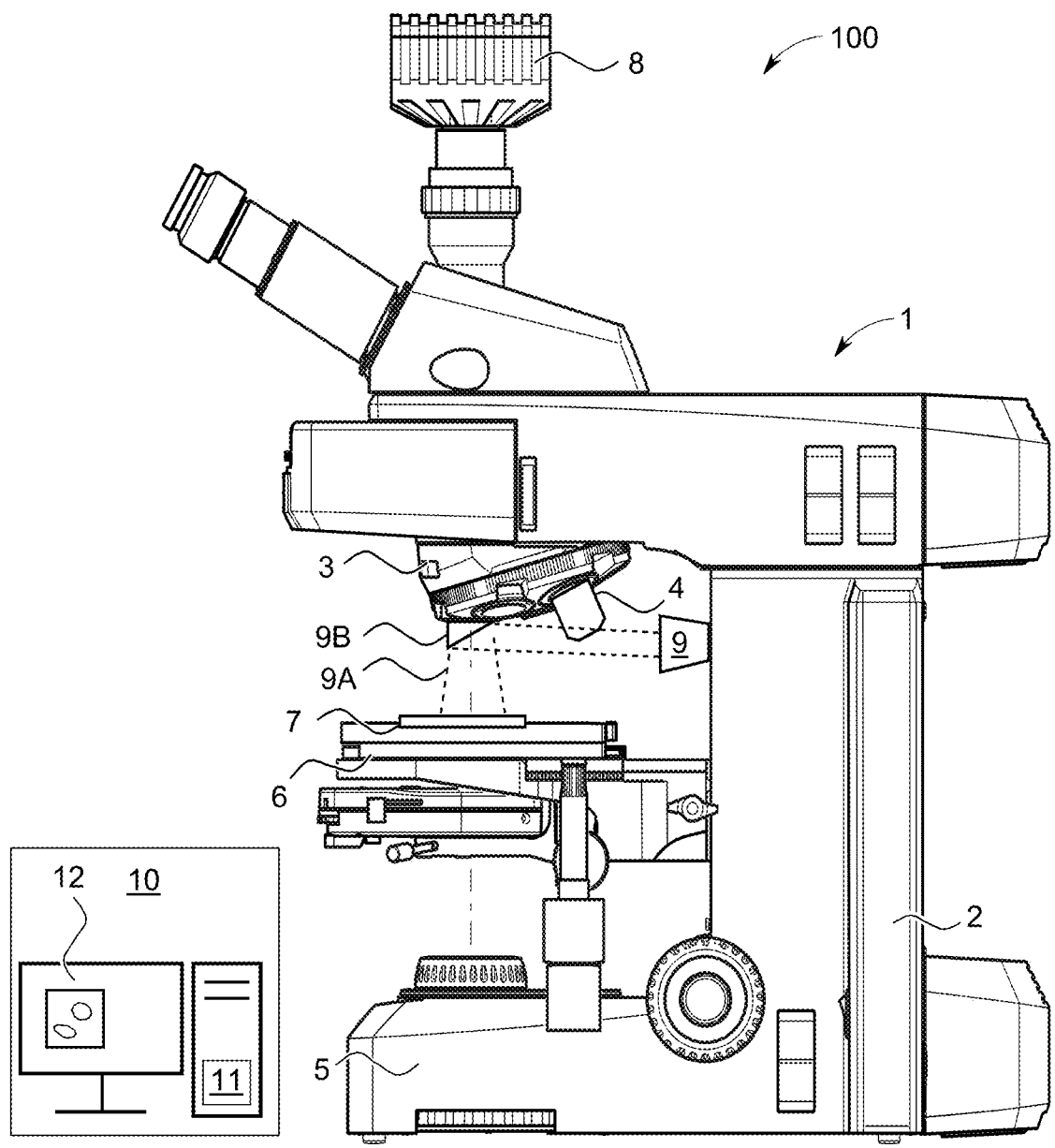
FIG. 1 schematically shows an example embodiment of a microscopy system of the invention.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 8. When the objective 4 is pivoted into the light path of the microscope, the microscope camera 8 receives detection light from a sample area in which a sample can be located in order to capture a microscope image. A sample can be any object, fluid or structure. The microscope 1 optionally comprises an additional overview camera 9 for capturing an overview image of a sample environment. The overview image can thus show in particular the sample carrier 7 or a part of the same. A field of view 9A of the overview camera 9 is larger than a field of view when a sample image is captured. In the illustrated example, the overview camera 9 views the sample carrier 7 via a mirror 9B. The mirror 9B is arranged on the objective revolver 3 and can be selected instead of the objective 4. In variants of this embodiment, the mirror is omitted or a different arrangement of the mirror or a different deflecting element is provided. The computing device 10 comprises an optional touchscreen 12 here with which, among other things, selection or weighting masks can be drawn or corrected manually. The computing device 10 also comprises a computer program 11 with an image processing model for processing at least one microscope image, i.e. a sample image or overview image. Such a microscope image, as well as chemically stained images, such as can optionally be captured with the microscope 1, are described in greater detail in the following with reference to FIG. 2.

FIG. 2

Figure 2:
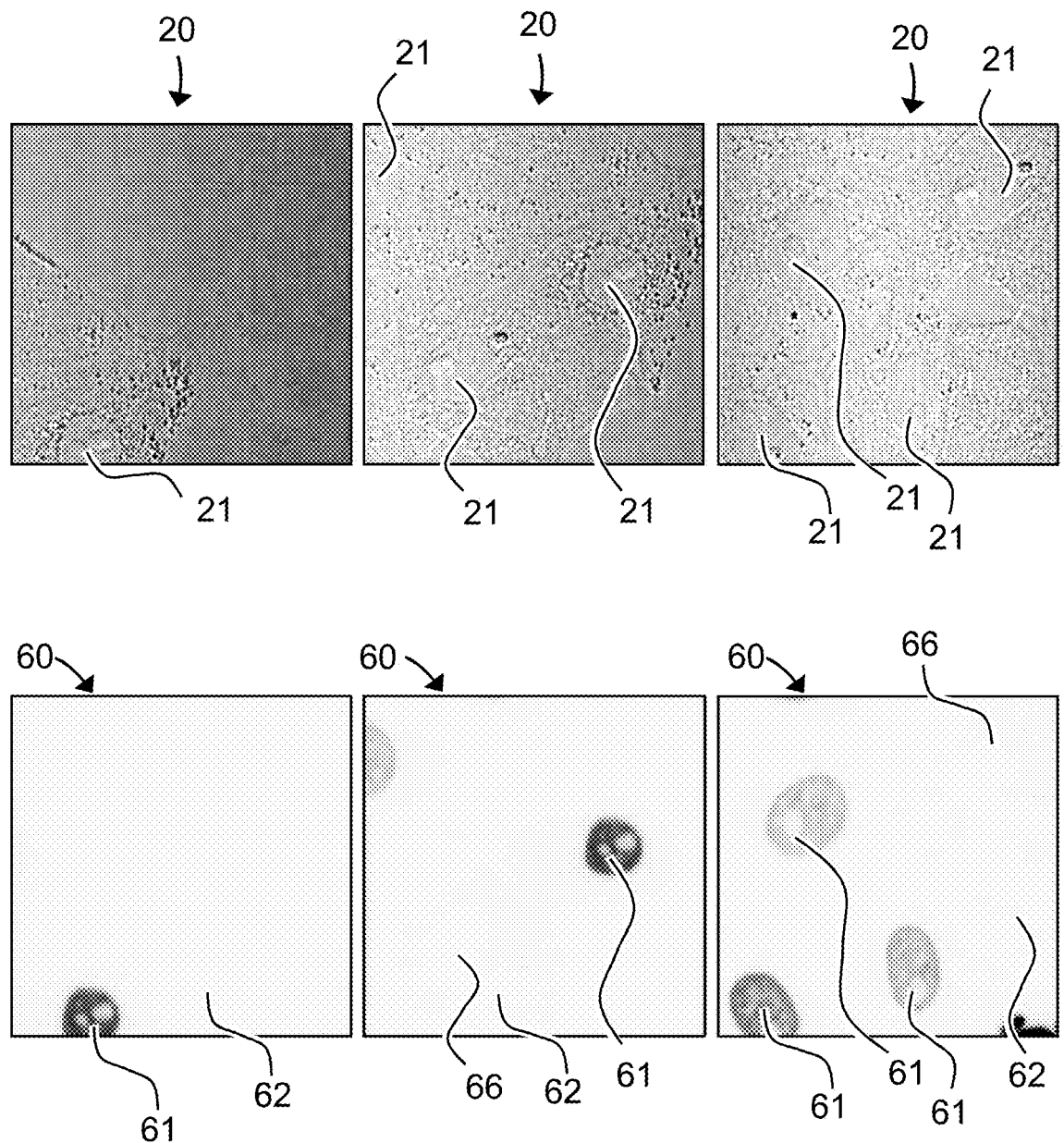
FIG. 2 schematically shows microscope images and associated chemically stained images.

FIG. 2 shows a plurality of microscope images 20 captured by the microscope 1, which can be, as illustrated, sample images. It is in principle also possible, however, for a microscope image to be an overview image. In the case shown, the microscope images 20 are phase contrast images of biological samples comprising a plurality of cell organelles as an example of sample structures 21 and can more generally comprise other structures or cells. A microscope image can also be formed by other imaging techniques, e.g., by differential interference contrast (DIC), by wide-field transmitted light imaging or by means of confocal images. In the example shown, certain sample structures 21 are relatively faintly visible. Chemically stained images 60 are thus often captured for a clearer analysis of the sample structures 21. In the case shown, these are fluorescence images, although, e.g., transmitted light images are alternatively also possible when absorbing dyes have been added to the sample. In FIG. 2, the chemically stained images 60 include stained regions 61 and unstained regions 62, which make up the rest of the image content. Sample structures 21 have been stained in the stained regions 61, whereby they can be discerned more clearly and potentially with more or different detail than in the microscope images 20.

While chemically stained images 60 offer advantages, they can also involve a higher expenditure in terms of equipment, a longer sample preparation and/or a greater subjection of the sample to stress due to, e.g., dyes or excitation light. Moreover, chemical stainings can be inaccurate. With some staining techniques, all the sample structures to be stained are not always actually stained. This problem arises, e.g., in the case of transfections in which DNA or RNA is introduced via which fluorophores are meant to be expressed. If this fails for some cells of the sample, a fluorescence signal is not emitted by all sample structures 21 to be stained. Such a case occurs in particular in image regions 66 in which a staining is not present although these areas contain cell organelles or sample structures 21 of the same type as in the regions 61.

Against this background, the invention provides a computer-implemented method in order to generate a stained image (virtually stained image) corresponding to a chemically stained image from a microscope image computationally, wherein drawbacks of a chemical staining are overcome. In particular, image regions 66 with an erroneously missing staining do not occur or occur less frequently in virtually stained images.

FIG. 3

Figure 3:
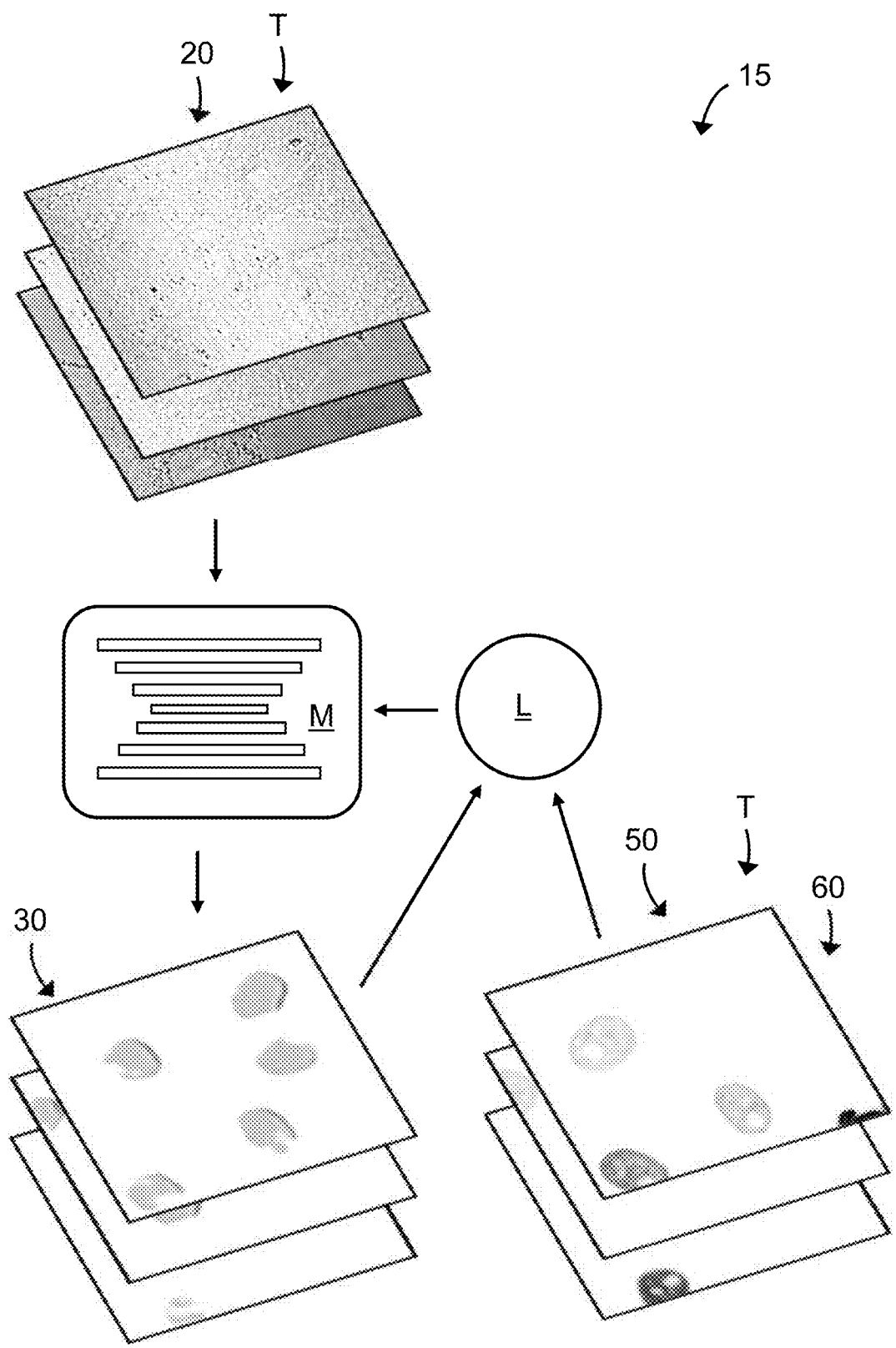
FIG. 3 schematically shows processes of an example embodiment of a method of the invention.

FIG. 3 schematically illustrates processes of an example embodiment of a computer-implemented method according to the invention for generating an image processing model M. The computing device 10 mentioned with reference to FIG. 1 or the computer program 11 are designed to execute this method.

The method comprises a training 15 in which the image processing model M is learned by machine learning using training data T, i.e., model parameter values of the model are defined iteratively by means of the training data T. The training data T comprises microscope images 20 and corresponding locally registered chemically stained images 60 as target images 50.

The microscope images 20 are input into the image processing model M, optionally in groups (batches). Based on current model parameter values, the image processing model M calculates a result image, which is meant to be a virtually stained image 30, from each of the input microscope images 20. The virtually stained images 30 are entered together with the associated chemically stained images 60 into an objective function L. The objective function L here is a loss function that respectively captures pixelwise differences between a pair consisting of a virtually stained image 30 and an associated chemically stained image 60. A learning algorithm iteratively minimizes the loss function, to which end a modification of the model parameter values of the image processing model M is determined by, e.g., gradient descent.

The next training step begins with the modified model parameter values, wherein a further adjustment of the model parameter values occurs using others of the microscope images 20. Multiple training steps are carried out, which generally constitute a training epoch, multiple training epochs or only a part of a training epoch. In this context, a training epoch can denote a number of training steps in the course of which all of the microscope images are input once into the image processing model. There then follow the processes described with reference to FIG. 4.

FIG. 4

Figure 4:
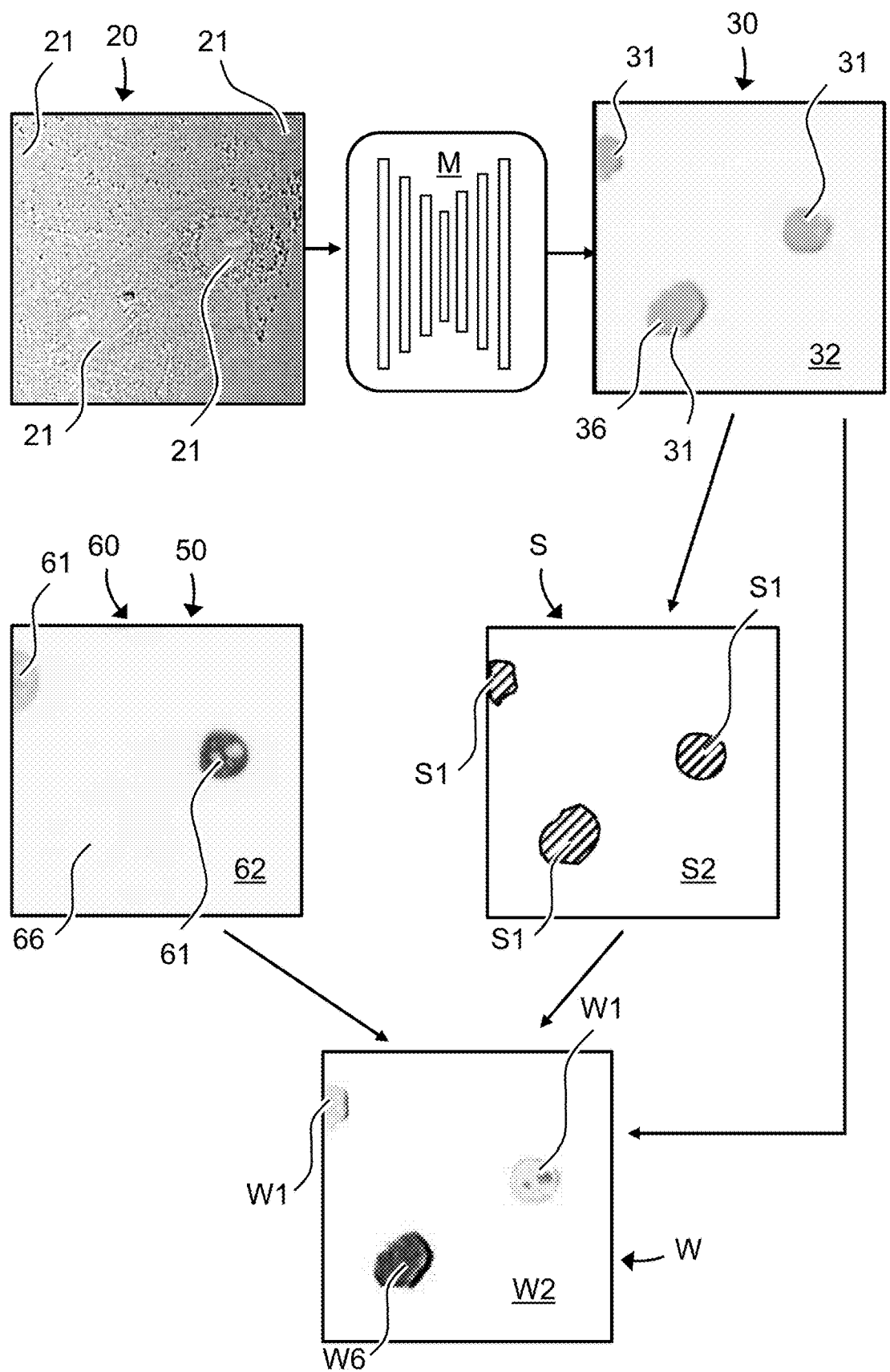
FIG. 4 schematically shows further processes of the example embodiment of FIG. 3.

FIG. 4 schematically shows processes for determining a weighting mask W used in the further training of the image processing model M.

The processes shown in FIG. 4 are carried out after a number of training steps of the image processing model M. The image processing model M is thereby already able to detect sample structures 21 to be stained in the microscope image 20 roughly but reliably. From an input microscope image 20, the image processing model M thus calculates a virtually stained image 30 in which stained regions 31 correspond relatively reliably in their position to the position of the corresponding sample structures 21 in the microscope image 20. Details of the stained regions 31, on the other hand, are not calculated correctly with the current training status of the image processing model M.

In the associated target image 50 or chemically stained image 60, only some of the sample structures 21 are correctly reproduced as stained regions 61. Conversely, another region 66, in which a sample structure 21 is also located, is erroneously not stained and is thus part of the unstained region 62. The image processing model M would only learn (undesirably) in the subsequent course of the training to replicate the missing stainings. In an earlier training stage, on the other hand, a virtually stained image 30 usually comprises a stained region 36 even when a locally corresponding region 66 of the chemically stained image 60 is inaccurate.

Next, a segmentation mask or selection mask S is calculated from the virtually stained image 30. In a simple case, this can occur by means of a comparison of the pixel values of the virtually stained image 30 with a threshold value. The selection mask S is a binary mask in which a pixel value marks stained regions S1 that correspond in their position to the stained regions 31 of the virtually stained image 30. The other pixel value of the selection mask S marks a background S2 and corresponds locally to the unstained regions 32 of the virtually stained image 30.

A weighting mask W is then calculated. In the weighting mask W, an image region W6 that corresponds locally to the inaccurate region 66 of the chemically stained image should receive a weaker weighting. Due to the weaker weighting, the inaccurate region 66 should provide a reduced contribution to the adjustment of the model parameter values in the further training of the image processing model M.

The weighting mask W can be formed, for example, by assigning a constant weight of, for example, 1 to all pixels classified as background S2 in the selection mask S. This pertains to the region W2 in the illustrated example. The pixels of the stained regions S1 of the selection mask S, on the other hand, are to be assigned a variable weight, which can lie in a value range between 0 and 1. Alternatively, a lower limit of the weighting can also be greater than 0, as explained in the general description. In the case shown, in order to define the weightings for the regions that correspond to the stained regions S1 of the selection mask S, the difference between the virtually stained image 30 and the chemically stained image 60 is calculated pixelwise. The greater the difference is, the smaller the weighting in the weighting mask W should be. If the values of two pixels that correspond locally in the virtually stained image 30 and in the chemically stained image 60 match, a weight of 1 or a maximum weighting is set. The greater the difference between the values of the two pixels is, the smaller the defined weighting. In the weighting mask of FIG. 4, a white pixel represents a weight of 1, and the darker a pixel is, the lower its weighting. As illustrated, the weighting in the region W6 is very low, because the chemically stained image 60 is inaccurate at the corresponding location, whereas the virtually stained image 30 correctly predicts a staining in the corresponding region 36, albeit without natural structural details. In the regions W1, the virtually stained image 30 and the chemically stained image 60 differ only marginally from each other, so that a weighting is only slightly reduced here.

In a variant, a threshold value comparison can be carried out for image pixels of the weighting mask W, wherein all pixels with a value above the threshold value (i.e., with a high weighting or small difference between the images 30 and 60) are set to a weight of 1. In the case shown, this leaves the region W6 as the only region with a reduced weighting. It is also possible to add further processing steps, such as a smoothing of the images 30 and 60, a smoothing of the difference between the images 30 and 60, or a smoothing of the weighting mask W.

FIG. 4 shows the approach for calculating a weighting mask W for a virtually stained image 30 and an associated chemically stained image 60. An associated weighting mask W can be calculated in an analogous manner for further pairs consisting of a virtually stained image 30 and an associated chemically stained image 60.

The use of the weighting masks W is explained with reference to the following figure.

FIG. 5

Figure 5:
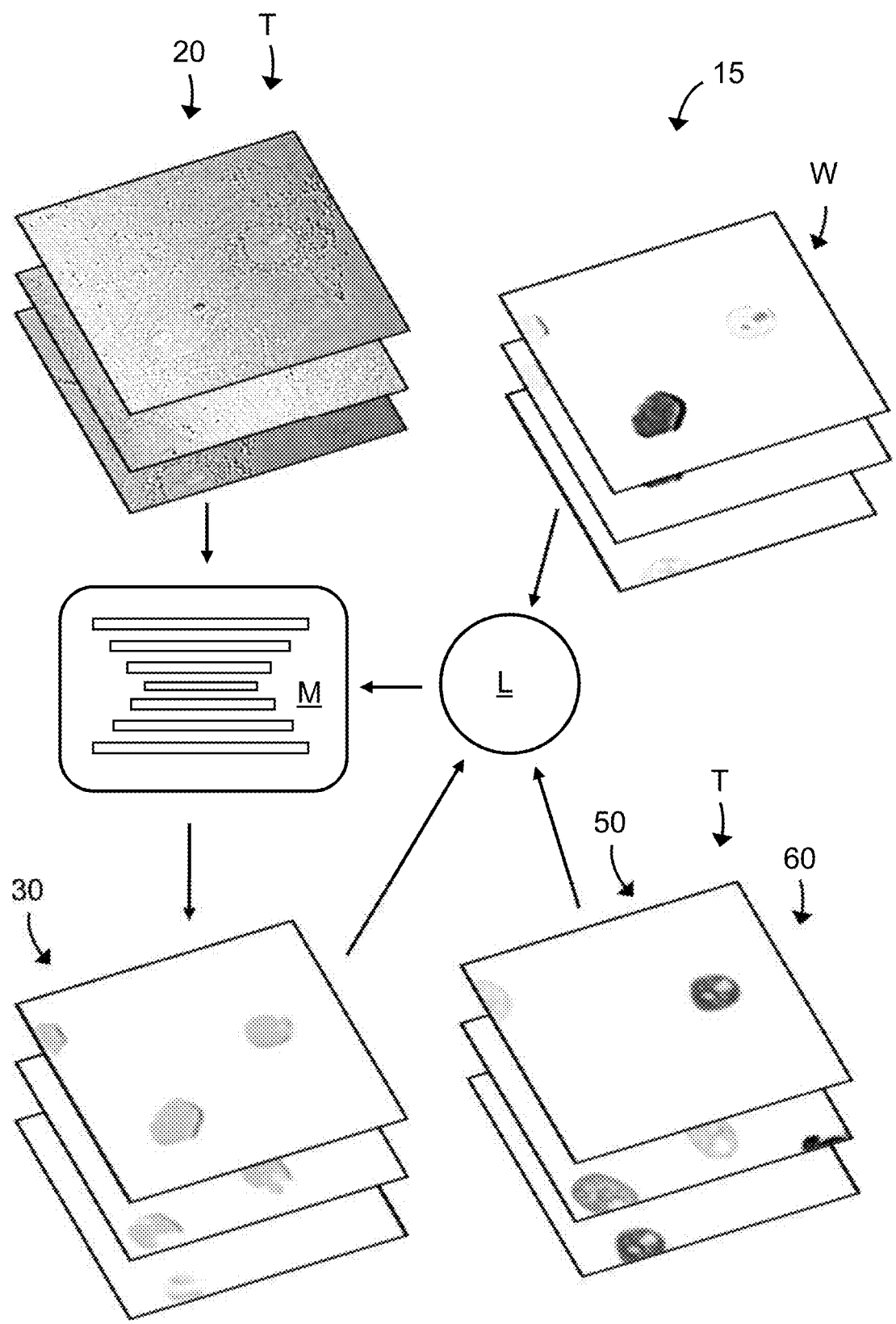
FIG. 5 schematically shows still further processes of the example embodiment of FIG. 3.

FIG. 5 illustrates the further course of the training 15. This is preceded by one or more training steps according to FIG. 3 and the calculation of weighting masks W according to FIG. 4.

The objective function L again captures differences between the calculated virtually stained images 30 and the specified chemically stained images 60. To this end, a difference between a pixel value of a virtually stained image 30 and the associated chemically stained image 60 can be calculated, e.g., pixelwise. Such a difference is now multiplied by the weight indicated by the locally corresponding pixel of the associated weighting mask W.

The adjustment of the model parameter values is thus only marginally influenced by regions that are inaccurately not stained in chemically stained images.

After the adjustment of the model parameter values, the described steps are repeated in each training epoch. New virtually stained images 30 are calculated with the adjusted model parameter values from the microscope images 20.

New weighting masks W are determined with the new virtually stained images 30. The new weighting masks W are then used in the objective function L.

The training 15 ends when a stop criterion is reached, for example after a predetermined number of epochs, when the results converge, or when a specified correspondence between the virtually stained images 30 and the target images 50 is reached, wherein the weighting masks W are used in the calculation of this correspondence.

FIG. 6

Figure 6:
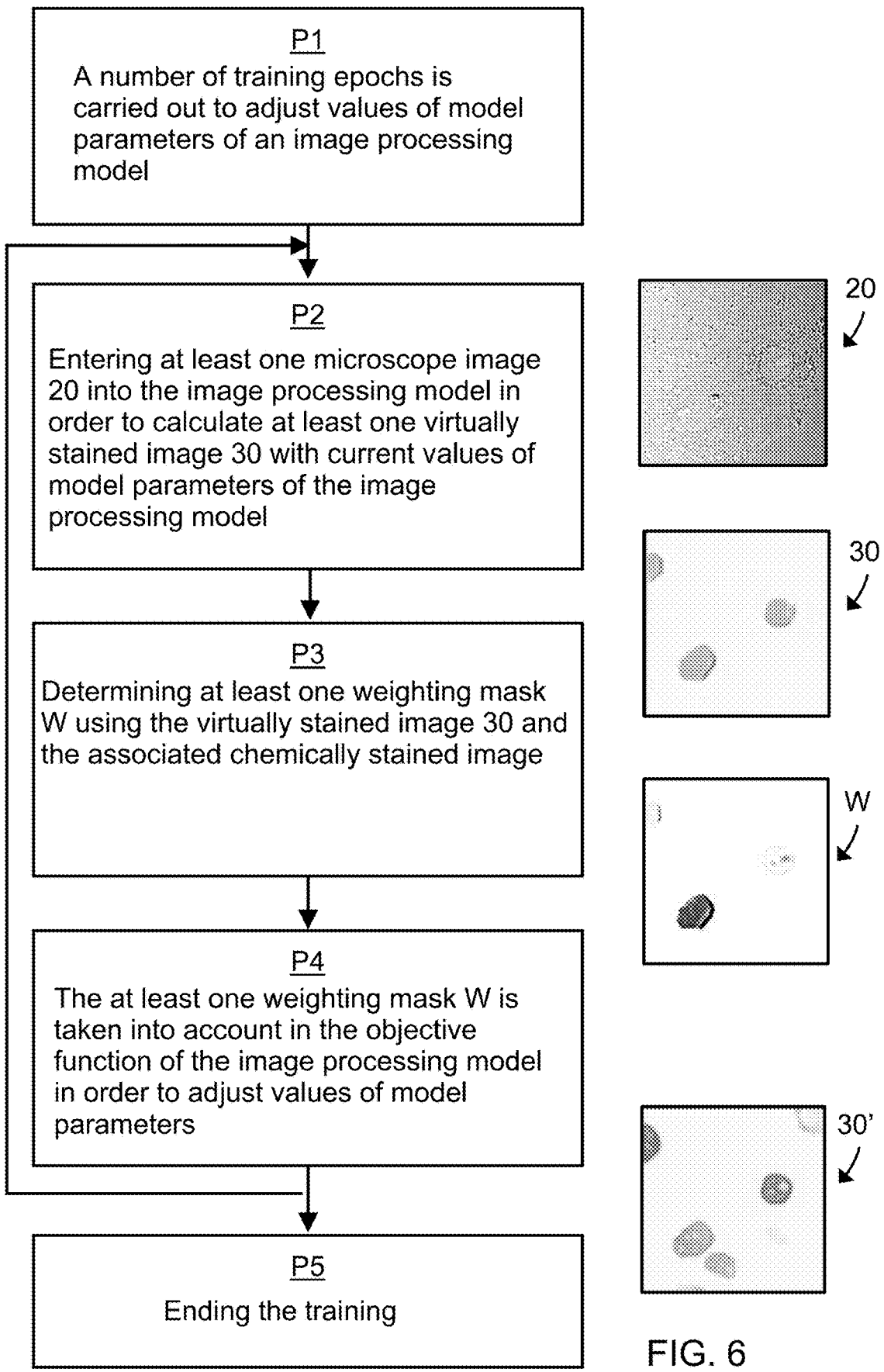
FIG. 6 schematically shows processes of a further example embodiment of a method of the invention.

FIG. 6 summarizes processes of example embodiments of the invention in a flowchart.

In a process P1, a training of the image processing model is carried out for a number of training steps in order to adjust values of model parameters of the image processing model.

After the number of training steps, at least one microscope image is entered into the image processing model in a process P2 in order to calculate at least one virtually stained image with current values of model parameters of the image processing model.

In a process P3, at least one weighting mask is calculated using the virtually stained image and the associated chemically stained image.

The at least one weighting mask is taken into account in the objective function of the image processing model in a process P4 in order to adjust values of model parameters.

The processes P2 to P4 are carried out within a training epoch. After the process P4, the processes P2 to P4 are repeated for a plurality of training epochs until the training is ended in a process P5. The image processing model M is now able to calculate a high-quality virtually stained image 30'.

In a variant, a determined weighting mask is retained for a plurality of training epochs before the weighting mask is updated.

FIG. 7

Figure 7:
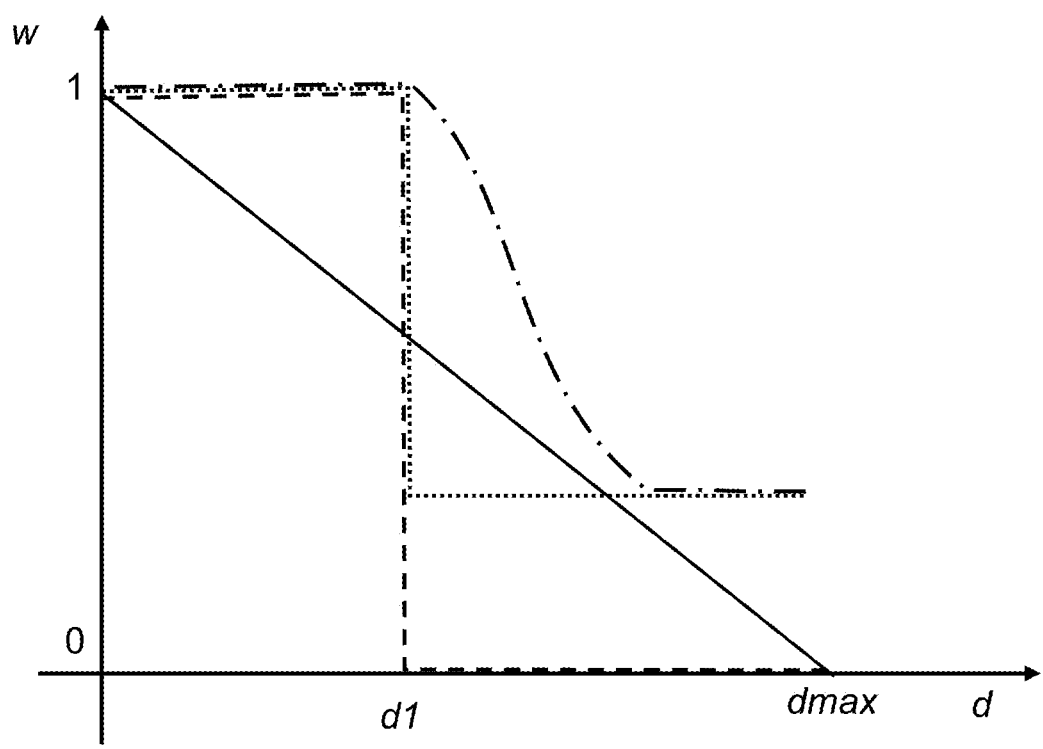
FIG. 7 schematically shows the determination of a weighting according to different example embodiments of the invention.

FIG. 7 illustrates different examples according to the invention for the definition of a weight value w in a weighting mask.

A difference d is calculated between a value of a pixel of a virtually stained image and a value of a locally corresponding pixel in the associated chemically stained image. A weight value w is defined for a locally corresponding pixel of the weighting mask as a function of this difference.

FIG. 7 shows a linear mapping of the difference d to a weight value w in the form of a solid line, wherein a maximum occurring difference dmax is mapped to a weight value of zero and a difference of zero is mapped to a weight value of 1.

Alternatively, it is possible to use the mapping illustrated in the form of a dashed line, according to which all differences d above a limit value d1 are assigned a weight of zero while all differences d below the limit value d1 result in a weighting of 1. In the variant illustrated as a dotted line, differences over d1 are assigned a reduced weight lying between 0 and 1.

A further variant, according to which differences d below d1 result in a constant weighting of 1 while a gradual weight reduction occurs for differences d above d1, is shown as a dash-dot line.

If weight values of 0 are allowed, it can in principle occur that the image processing model learns to predict strong stainings in all image regions. This would maximize the difference d for each pixel so that the weight value w for each pixel of the weighting mask would be zero. Discrepancies between a virtually stained image and an associated chemically stained image would thereby enter the objective or loss function with a weighting of zero, whereby the loss function would be minimized. This can be avoided with a minimum allowed weight value that is greater than 0. A further measure is described with reference to the following figure.

FIG. 8

Figure 8:
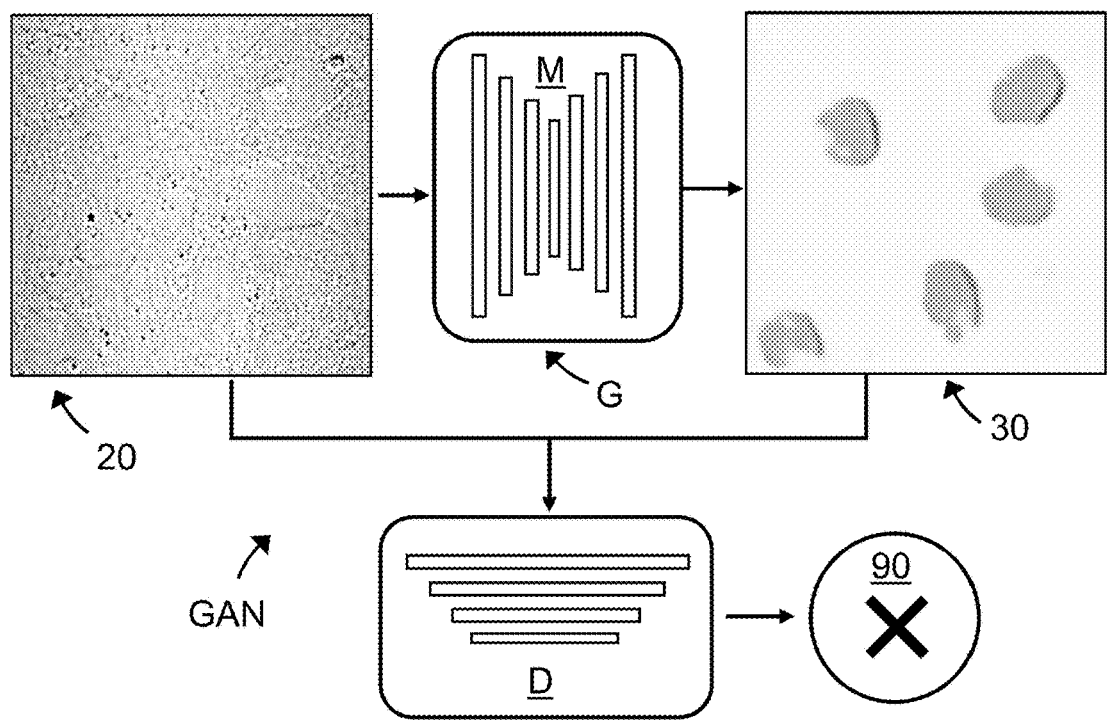
FIG. 8 schematically shows components of an example embodiment of the invention.
Figure 8:
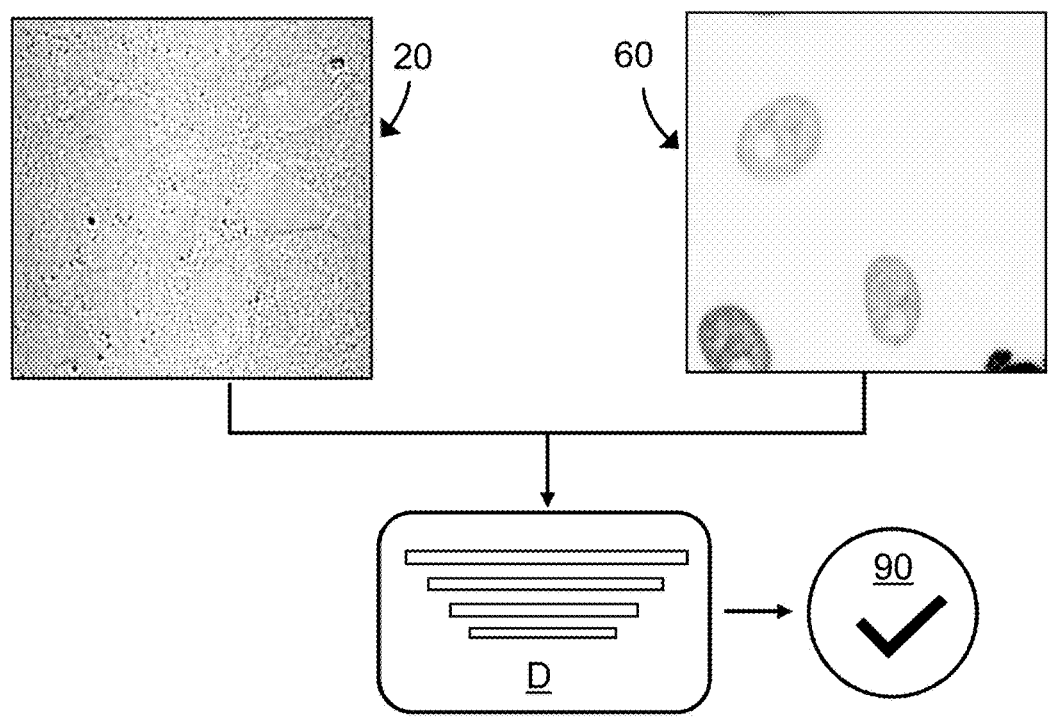

FIG. 8 shows aspects of an example embodiment according to the invention in which a generative adversarial network (GAN) comprising a generator G and a discriminator D is used. The image processing model M constitutes the generator G. An input of the image processing model M comprises, as described, a microscope image 20, so that the GAN can also be called a conditional GAN. The generator G and discriminator D are trained together. An input of the discriminator D comprises an image pair or sections of these images. The image pair can comprise a microscope image 20 and an associated virtually stained image 30 generated by the generator G (upper part of FIG. 8) or sections of the same. Other image pairs comprise a microscope image 20 and a chemically stained image 60 (lower part of FIG. 8). The discriminator D calculates a discrimination result 90 from the input, which is a classification or an indication of the probability of whether the entered image pair contains a virtually stained image 30 or a chemically stained image 60.

In common objective functions of the training of a GAN, the objective function of the generator results from the objective function of the discriminator. As a special feature, the weighting mask as described in the foregoing examples is used in the training of the GAN here. In different variants of the invention, the weighting mask is used solely for training the generator G, but not for the training of the discriminator D. The weighting mask can thus enter the objective function to be optimized for the generator G, whereas it is not taken into account in the objective function to be optimized for the discriminator D.

This approach additionally ensures that the generated virtually stained images 30 look real, that is, in particular, that they appear to come from a statistical distribution of the chemically stained images 60.

However, in cases where the chemically stained images 60 exhibit a high number of missing stainings, there would be a statistical difference in relation to virtually stained images in which the missing stainings have been added. In these cases, the virtually stained images should not be classified as fake by the discriminator. For this purpose, a frequency can be modified with which image pairs are entered into the discriminator D in the training. Each image pair of the training data consisting of a microscope image 20 and an associated chemically stained image 60 as well as each corresponding image pair consisting of a microscope image 20 and a virtually stained image 30 are typically entered into the discriminator D once per training epoch. It is conversely possible for the image pairs with a chemically stained image 60 to be entered with different frequencies per training epoch, as a function of how strong the stainings in these images are. The stronger the stainings are, the more frequently the corresponding image pair is entered per training epoch. The strength of a staining can be captured as the number of stained pixels, optionally while taking into account the respective intensity, i.e. the value of the pixel. The statistical distribution of input image pairs with chemically stained images 60 is thereby aligned with a statistical distribution of image pairs with virtually stained images 30 in which missing stainings of the chemically stained images 60 are corrected. Instead of a more frequent input of an image pair, this image pair can also be given a stronger weighting in the objective function of the discriminator.

In variants of the described embodiment, it is possible to provide that, instead of an image pair, solely a virtually stained image 30 or a chemically stained image 60 is input into the discriminator D. The objective function of the generator G can be formed here as described with reference to the foregoing figures.

FIG. 9

Figure 9:
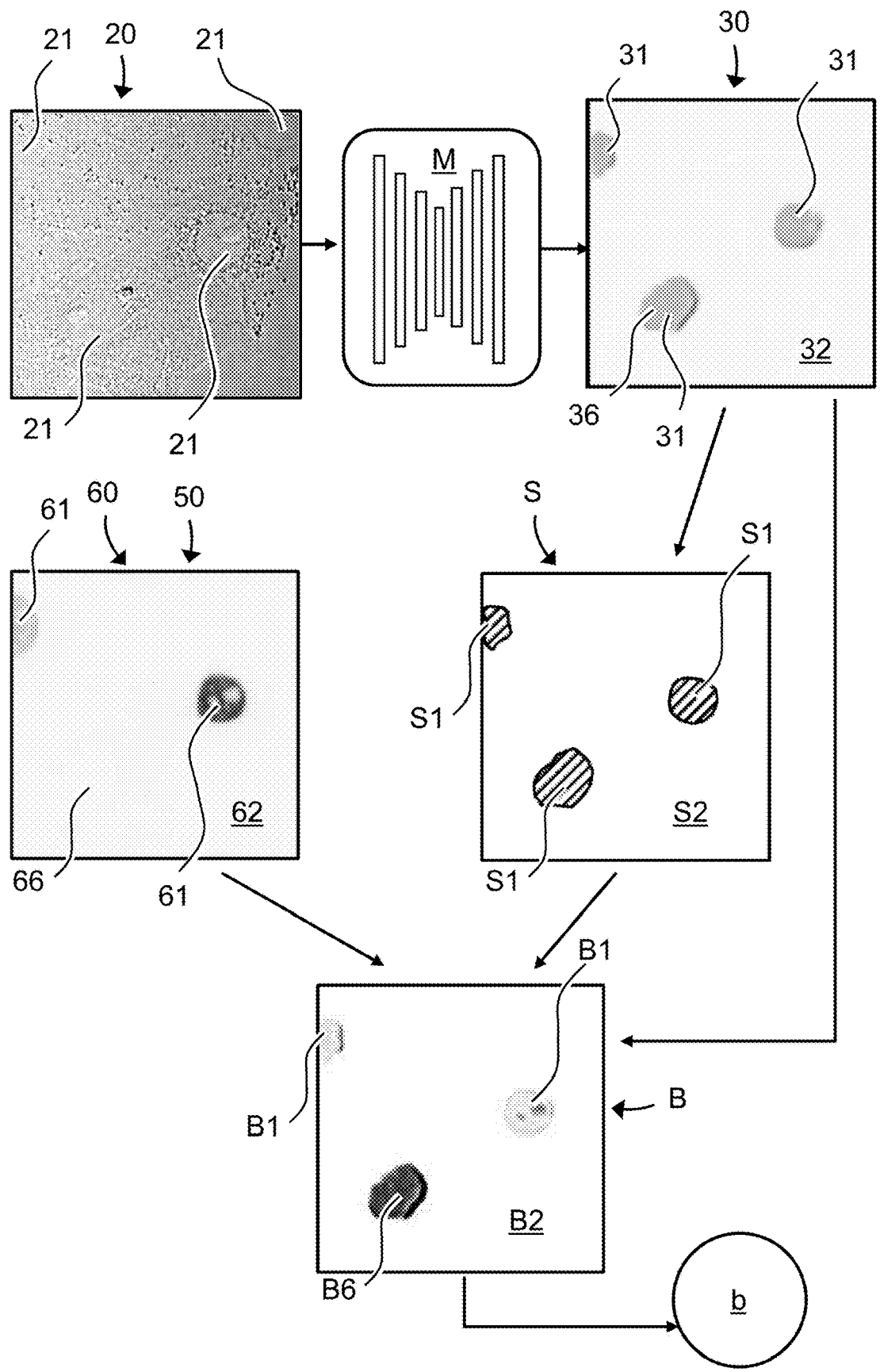
FIG. 9 schematically shows processes of a further example embodiment of a method of the invention.

FIG. 9 shows processes of a further example embodiment of a method for generating an image processing model M in order to generate a virtually stained image 30 from a microscope image 20. This example embodiment can begin with the steps described with reference to FIG. 3 and represents a modification of the processes shown in FIG. 4.

As also described with reference to FIG. 4, after a number of training steps, a virtually stained image 30 calculated by the image processing model M is used to calculate a selection mask S. For the regions S1 of the selection mask S, a comparison of the corresponding image regions of the virtually stained image 30 and the chemically stained image 60 is carried out. For example, the difference between the pixels of the image regions 36 and 66 is calculated pixelwise. These differences can be represented as an evaluation mask B. The calculation can optionally be carried out as described for the weighting mask, wherein a compression to a value range between 0 and 1 can be omitted. A low weighting in a weighting mask corresponds to a poor evaluation here, as in the image region B6, while a high weighting corresponds to a good evaluation, as in the image region B2 and largely in the image regions B1.

In a variant of the invention, it is determined whether the evaluation of one of the image regions B1, B6 lies below a specified threshold value. In this case, a locally corresponding image region of the chemically stained image 60 (and optionally of the microscope image 20) is removed from the training data T. The removed image data is not taken into account in the further course of the training or in the event of a reinitiation of the training. Instead of a specified threshold value, it is also possible to provide that a respective evaluation mask B is calculated for a plurality of pairs consisting of a virtually stained image 30 and a chemically stained image 60 and that subsequently the image regions with the worst evaluations are determined. The locally corresponding image regions of chemically stained images 60 (and optionally of microscope images 20) are in turn removed from the training data T.

In another variant of the invention, the evaluation mask B is combined into a single evaluation b. The evaluation b indicates an overall evaluation of the entries of the evaluation mask B and can be calculated, for example, by adding all entries of the evaluation mask B.

Analogously to the foregoing variants, it is now possible to define an exclusion from the training data, which, however, does not relate to an image region, but rather to an entire chemically stained image 60 and an associated microscope image 30. The exclusion from the training data can again be defined by means of a comparison with a threshold value, or by creating a ranking of evaluations b for a plurality of image pairs, whereupon the image pairs with the worst evaluation b are removed from the training data T.

In a further variant, it is also possible to calculate an evaluation b by forming the difference between a virtually stained image 30 and the associated stained image 60 directly.

Interactive variants result when the image data intended for an exclusion from the training data is displayed to a user and the user can then decide whether the exclusion should actually occur.

FIG. 10

Figure 10:
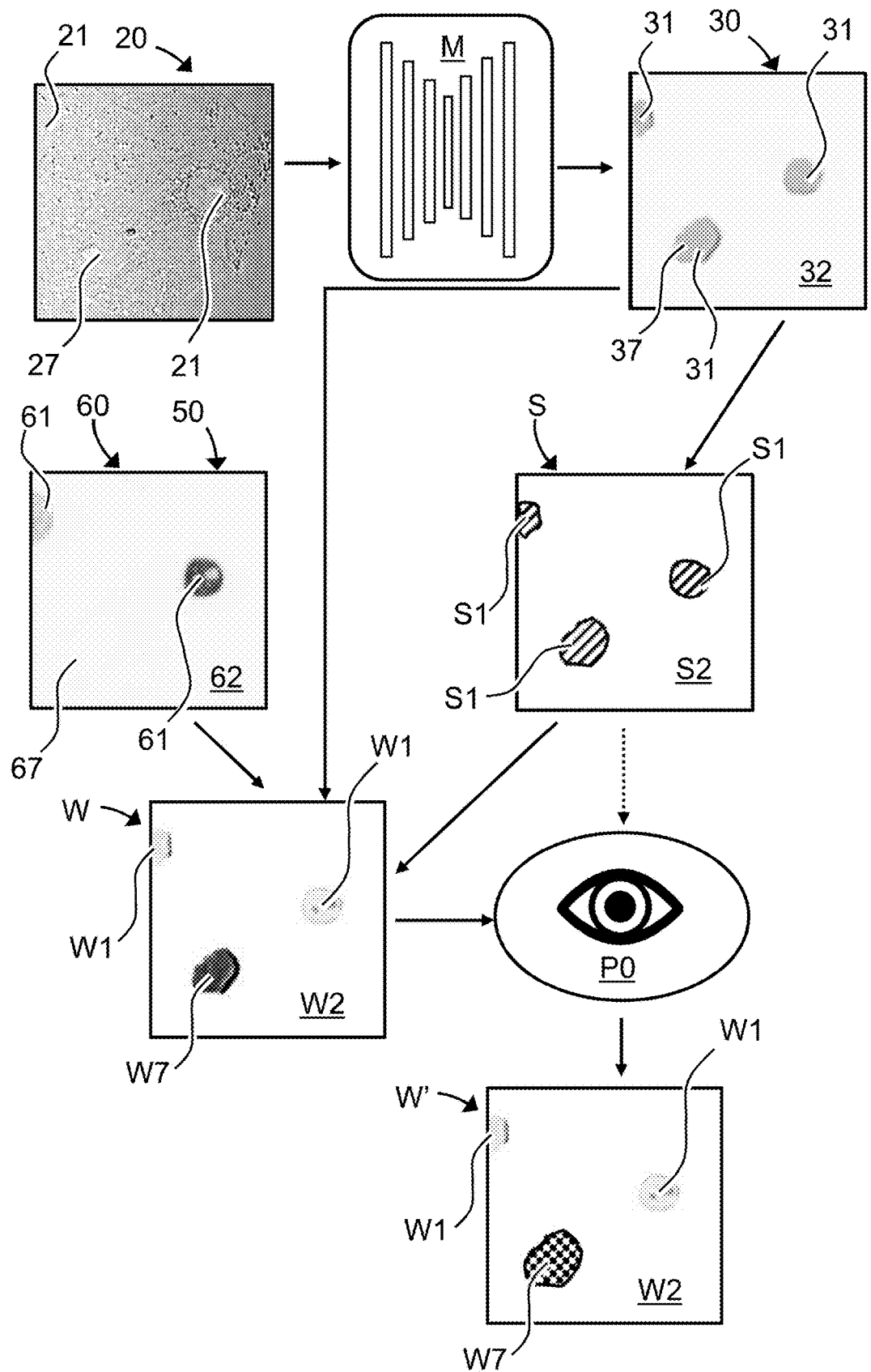
FIG. 10 schematically shows processes of a further example embodiment of a method of the invention.

FIG. 10 illustrates a further embodiment of a method for generating an image processing model M. This example embodiment corresponds to the example embodiment described with reference to FIG. 4, with the following differences:

A calculated weighting mask W is not used directly in the subsequent training. Instead, the weighting mask W or the associated selection mask S is displayed to a user for verification in a process P0. The user can confirm the weighting mask W or selection mask S as correct, whereupon the weighting mask W is used in the following training. Alternatively, the user can make changes in order to generate a corrected weighting mask W.

In the merely schematically illustrated example, the sample comprises a sample region 27 that has correctly not been chemically stained, so that in the chemically stained image 60 a corresponding image region 37 is correctly not stained. However, as the sample region 27 in the microscope image 20 resembles a sample structure 21 to be stained, a corresponding image region 37 has inaccurately been stained in the virtually stained image 30. This image region 67, which is correct in the chemically stained image 60, would consequently be given a weaker weight in the weighting mask W, see the locally corresponding image region W7 of the weighting mask. In order to avoid this, the user marks the image region W7. In the corrected weighting mask W, a weight value of the image region W7 is set to a non-reduced value, in this example to a value of 1. The corrected weighting mask W is now used in the objective function and thus in the adjustment of the model parameters. If the same chemically stained image 60 is used again in the further training, a new virtually stained image and thus a new weighting mask is calculated using the current model parameter values. In the new weighting mask, the image region W7 marked by the user remains unchanged while the remaining regions of the weighting mask are recalculated. The new weighting mask no longer needs to be shown to the user for verification.

In order to keep a manual effort low for a user, the embodiment described above can be supplemented by an automated selection step, which defines which of a plurality of weighting masks (or which of the associated selection masks) are displayed to a user for verification. For this purpose, it can be calculated how strong weight reductions are in the respective weighting mask W. As a corresponding measure, all weighting values of a weighting mask can be aggregated, e.g., added or averaged. Only the weighting masks with the strongest weighting reductions are displayed to the user. This selection essentially relates to the weighting masks for which the associated virtually stained image and the associated chemically stained image conflict.

FIG. 11

Figure 11:
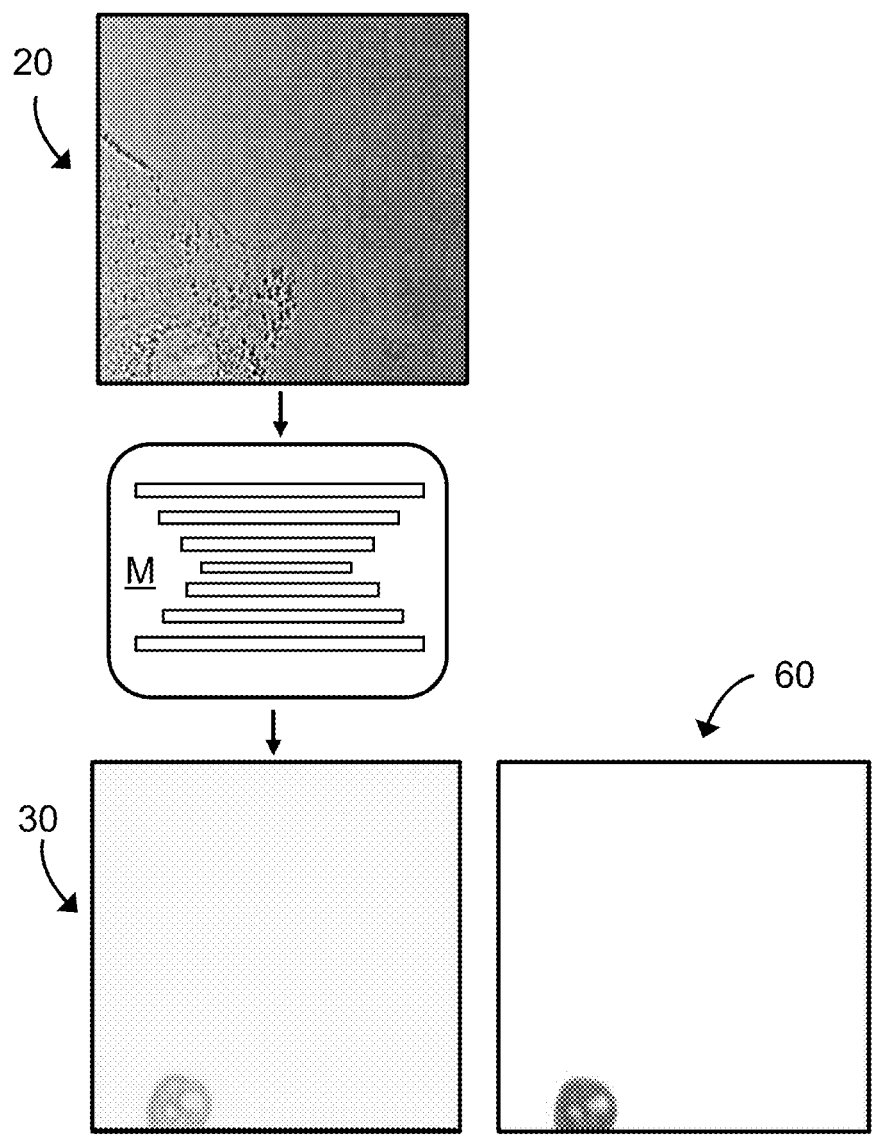
FIG. 11 schematically shows processes of a still further example embodiment of a method of the invention.

FIG. 11 shows an example embodiment of a method according to the invention for generating a virtually stained image. In this case, the image processing model M is used in the inference phase, that is, after completion of a training described in the foregoing, in order to process a microscope image 20 that was not part of the training data.

First, the microscope image 20 is obtained, e.g., loaded from a memory or captured by the microscope of FIG. 1.

The microscope image 20 is input into the image processing model M, which calculates a virtually stained image 30 therefrom. Solely for the purposes of comparison, FIG. 10 also shows an associated chemically stained image 60, which, however, is not needed for the inference phase.

The variants described with reference to the different figures can be combined with one another. Potential errors contained in the chemically stained images are also not limited to the illustrated cases. Unwanted stainings of other sample regions can also be present, in which case a weight reduction or exclusion of the corresponding image data can likewise be achieved for the further training by means of the described steps. The influence of other image artefacts on the training can also be at least partially reduced in this manner. The described example embodiments are purely illustrative and variants of the same are possible within the scope of the attached claims.

LIST OF REFERENCE SIGNS

1 Microscope
2 Stand
3 Objective revolver
4 (Microscope) objective
5 Illumination device
6 Sample stage
7 Sample carrier
8 Microscope camera
9 Overview camera
9A Field of view of the overview camera
9B Mirror
10 Computing device
11 Computer program
12 Touchscreen
15 Training
20 Microscope image
21 Sample structures
27 Sample region
30, 30' Virtually stained image
31, 36 Stained image regions of the image 30
32 Unstained image regions of the image 30
37 Erroneously stained image region of the image 30
50 Target image
60 Chemically stained image
61 Stained image region in the chemically stained image
62 Unstained image region in the chemically stained image
66 Missing staining in the chemically stained image
67 Correctly unstained region in the chemically stained image
90 Discrimination result
100 Microscopy system
b Evaluation
B Evaluation mask
B1, B2, B6 Image regions of the evaluation mask
d Difference between pixels of the virtually stained image and the target image
d1 Specified limit value for differences between pixels of the virtually stained image and the target image
dmax Maximum occurring difference between pixels of the virtually stained image and the target image
D Discriminator
G Generator
GAN Generative adversarial network
L Objective function
M Image processing model
P0-P5 Processes of an example embodiment of the method of the invention
S Selection mask for a virtually stained image
S1 Regions of the selection mask which mark regions to be stained
S2 Background regions of the selection mask, corresponding to regions that are not to be stained
T Training data for learning the image processing model M
W Weighting mask
W Corrected weighting mask
W1, W2, W6, W7 (Image) regions of the weighting mask W, W
W Weight value/weighting of the weighting mask W

The invention claimed is:

1. A computer-implemented method for generating an image processing model in order to calculate a virtually stained image from a microscope image, comprising:
training of the image processing model using training data, wherein the training data comprises at least:
microscope images as input data into the image processing model, and
target images that are formed via chemically stained images registered locally in relation to the microscope images;
wherein the image processing model is trained to calculate virtually stained images from the input microscope images by optimizing an objective function that captures a difference between the virtually stained images and the target images;
defining at least one weighting mask after a number of training steps using at least one of the chemically stained images and an associated virtually stained image calculated after the number of training steps;
wherein, in the weighting mask, one or more image regions are weighted based on differences between locally corresponding image regions in the virtually stained image and in the chemically stained image; and
continuing the training, wherein the weighting mask is taken into account in the objective function.

2. The computer-implemented method according to claim 1,
wherein, in the weighting mask, a plurality of image regions are weighted differently as a function of differences between locally corresponding image regions in the virtually stained image and in the chemically stained image, so that the differently weighted image regions contribute in different degrees when the training is continued.

3. The computer-implemented method according to claim 1,
wherein the weighting mask is taken into account in the objective function by weighting differences between one of the target images and the associated virtually stained image in a location-dependent manner according to the associated weighting mask.

4. The computer-implemented method according to claim 1,
wherein, in the weighting mask, an image region is given a weaker weight as a function of whether a locally corresponding image region in the virtually stained image exhibits a stronger staining than a locally corresponding image region in the chemically stained image.

5. The computer-implemented method according to claim 1,
wherein a selection mask is calculated from at least one of the virtually stained images, wherein the selection mask indicates which image regions in the virtually stained image are stained and which image regions are not stained;

wherein, in the weighting mask, only image regions that are indicated as stained in the selection mask are weighted variably.

6. The computer-implemented method according to claim 1,
wherein the weighting mask is updated in each training epoch or at least in some training epochs.

7. The computer-implemented method according to claim 1,
wherein the weighting mask or selection mask is displayed to a user for confirmation, correction or rejection, and
wherein, in the event of a correction by the user, an updating of the corrected weighting mask or selection mask does not occur in subsequent training epochs.

8. The computer-implemented method according to claim 1,
wherein the weighting mask is taken into account in the objective function by modifying the virtually stained image entering the objective function by superimposing the virtually stained image and the associated chemically stained image, wherein the weighting mask defines weights for superimposing the virtually stained image and the associated chemically stained image.

9. The computer-implemented method according to claim 1,
wherein, for the determination of the weighting mask-AWA, a smoothing or blurring of image data is carried out with a filter size of an order of magnitude corresponding to a size of stained image regions of the chemically stained images.

10. The computer-implemented method according to claim 1,
wherein the image processing model is a generator of a generative adversarial network,
wherein the generative adversarial network comprises a discriminator, which receives as input either an image pair comprising a microscope image and a virtually stained image generated therefrom by the generator, or an image pair comprising a microscope image and an associated chemically stained image, wherein an output of the discriminator is a discrimination result that indicates what kind of image pair was entered,
wherein the generator and the discriminator are trained together and the weighting mask is taken into account solely for the objective function of the generator, but not for a discriminator objective function.

11. The computer-implemented method according to claim 10,
wherein image pairs comprising a microscope image and an associated chemically stained image are input into the discriminator in the training more frequently with increasing colour strength in the chemically stained image.

12. The computer-implemented method according to claim 10,
wherein a degree to which structures to be stained are inaccurately not stained is determined for each of the chemically stained images,
wherein image pairs comprising a microscope image and an associated chemically stained image are input into the discriminator in the training more frequently, the lower the associated degree.

13. The computer-implemented method according to claim 1,
wherein, in the weighting mask, all image regions have a weighting greater than zero.

14. A computer-implemented method for generating an image processing model in order to calculate a virtually stained image from a microscope image, the method comprising:
training of the image processing model using training data, wherein the training data comprises at least:
microscope images as input data into the image processing model, and
target images that are formed via chemically stained images registered locally in relation to the microscope images;
calculating an evaluation of one of the chemically stained images or an image region of the same after a number of training steps, wherein the evaluation evaluates differences between locally corresponding image regions in the chemically stained image and in an associated virtually stained image calculated with the image processing model after the number of training steps;
changing the training data by removing the chemically stained image or an image region of the same from the training data, depending on the evaluation; and
continuing or reinitiating the training with the changed training data.

15. A microscopy system comprising:
a microscope for image capture; and
a computing device that is configured to execute the computer-implemented method according to claim 14.

16. A computer program stored on a non-transitory computer-readable medium, comprising commands which, when the program is executed by a computer, cause the computer to execute the method according to claim 14.

17. A microscopy system comprising:
a microscope for image capture; and
a computing device that is configured to execute the computer-implemented method according to claim 1.

18. A computer program stored on a non-transitory computer-readable medium, comprising commands which, when the program is executed by a computer, cause the computer to execute the method according to claim 1.

* * * * *

UNITED STATES PATENT AND TRADEMARK OFFICE
CERTIFICATE OF CORRECTION

| | | |
|---|---|---|
| PATENT NO. | : 12,087,041 B2 | Page 1 of 1 |
| APPLICATION NO. | : 18/565315 | |
| DATED | : September 10, 2024 | |
| INVENTOR(S) | : Alexander Freytag et al. | |

It is certified that error appears in the above-identified patent and that said Letters Patent is hereby corrected as shown below:

In the Specification

Column 26, Line 14, --mask W-- should read --mask W'--.

Column 26, Line 28, --mask W-- should read --mask W'--.

Column 26, Line 31, --mask W-- should read --mask W'--.

Column 28, Line 6, --W Corrected weighting mask-- should read --W' Corrected weighting mask--.

Column 28, Line 8, --W, W-- should read --W, W'--.

Column 28, Line 9, --W Weight value-- should read --w Weight value--.

Signed and Sealed this
Twenty-first Day of January, 2025

Coke Morgan Stewart
*Acting Director of the United States Patent and Trademark Office*